United States Patent [19]
Okamoto et al.

[11] Patent Number: 5,810,922
[45] Date of Patent: *Sep. 22, 1998

[54] HARDENING COMPOSITION AND HARDENED PRODUCT

[75] Inventors: Toyoshige Okamoto; Yasuyuki Ishida; Jun Uchida, all of Sakura, Japan

[73] Assignee: Chichibu Onoda Cement Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 809,991

[22] PCT Filed: Aug. 14, 1996

[86] PCT No.: PCT/JP96/02298

§ 371 Date: Apr. 11, 1997

§ 102(e) Date: Apr. 11, 1997

[87] PCT Pub. No.: WO97/07072

PCT Pub. Date: Feb. 27, 1997

[30] Foreign Application Priority Data

Aug. 14, 1995 [JP] Japan ................................... 7-206946
Dec. 27, 1995 [JP] Japan ................................... 7-354875

[51] Int. Cl.⁶ ............................ C04B 7/28; C04B 7/14; C04B 18/10
[52] U.S. Cl. ......................... 106/714; 106/789; 106/790; 106/791; 106/624
[58] Field of Search .................................. 106/789, 790, 106/791, 714, 624

[56] References Cited

U.S. PATENT DOCUMENTS

| | | | |
|---|---|---|---|
| 4,961,787 | 10/1990 | Majumdar et al. | 106/791 |
| 5,073,198 | 12/1991 | Kurz | 106/789 |
| 5,082,501 | 1/1992 | Kurz | 106/789 |
| 5,593,493 | 1/1997 | Krofchak | 106/789 |

FOREIGN PATENT DOCUMENTS

| | | | |
|---|---|---|---|
| 1810039 | 7/1970 | Germany | 106/789 |
| 57-100969 | 6/1982 | Japan | 106/789 |
| 952797 | 8/1982 | U.S.S.R. | 106/789 |
| 979288 | 12/1982 | U.S.S.R. | 106/789 |
| 1193137 | 11/1985 | U.S.S.R. | 106/789 |
| 1170084 | 11/1969 | United Kingdom | 106/791 |
| 2153341 | 8/1985 | United Kingdom | 106/789 |

OTHER PUBLICATIONS

Patent Abstracts of Japan, abstract of Japanese Patent Specification No. 07–165447A, Jun. 1995.

Patent Abstracts of Japan, abstract of Japanese Patent Specification No. 06–345501A, Dec. 1994.

WPIDS Abstract No. 88–186596, abstract of Japanese Patent Specification No. 63–123842, May 1988.

Chemical Abstract No. 108:209182 which is an abstract of Japanese Patent Specification No. 63–045157 (Feb. 1988).

WPIDS Abstract No. 92–028789 which is an abstract of Japanese Patent Specification No. 06–099168 (Dec. 1994).

*Primary Examiner*—Anthony Green
*Attorney, Agent, or Firm*—Oblon, Spivak, McClelland, Maier & Neustadt, P.C.

[57] ABSTRACT

The present invention is directed to a hardening composition characterized by comprising (A) a slag composition containing 0 to 37 wt. % of CaO, 23 to 90 wt. % of $SiO_2$, and 0 to 40 wt. % of $Al_2O_3$ and 0.1 to 50 wt. % of one or more compounds selected from the group consisting of iron oxide, alkali components, phosphorous components, titanium dioxide, manganese oxide, and magnesium oxide, and/or 0.1 to 10 wt. % of a halogen; and (B) an alkaline activator. The invention is also directed to a hardened product obtained by mixing the hardening composition with water. The properties of the hardened product are suitable for use as various concrete materials, and therefore, refuse-incinerated ashes sewage sludge, etc. are effectively utilized and recycled as a resource.

9 Claims, No Drawings

HARDENING COMPOSITION AND HARDENED PRODUCT

TECHNICAL FIELD

The present invention relates to a hardening composition which contains a slag composition and to a hardened product thereof, and more specifically to a hardening composition prepared through use of a composition produced by converting various wastes into the form of a fused slag. The hardening composition is capable of forming a hardened product having excellent strength when mixed with water and cured, and is used as material for mortar, concrete, and the like.

BACKGROUND ART

Conventionally, cement has been widely used as a hardening composition for use in mortar, concrete, and the like. Cement as represented by portland cement is obtained by burning in a kiln a material composition which contains limestone as a principal material, and which is a so-called hydraulic material which hardens through hydration.

Granulated blast furnace slag is known as a hardening material to be mixed with portland cement. Granulated blast furnace slag is obtained in a pig iron manufacturing process, is composed mainly of the three components $SiO_2$, $Al_2O_3$, and CaO, and normally has the following composition: CaO 38–45%, $SiO_2$ 33–35%, $Al_2O_3$ 14–18%, MgO 4–8%, and $Fe_2O_3$ 0.5–2%. Granulated blast furnace slag is produced by quenching molten slag that comes from a blast furnace. Because of quenching, granulated blast furnace is mostly vitrified without being crystallized; thus, granulated blast furnace slag is said to have latent hydraulicity. Through stabilization granulated blast furnace slag hardens in the form of $CaO$-$SiO_2$—$H_2O$—based gel, and CaO content is said to be an important factor for this hardening. Particularly, blast furnace cement composed of granulated blast furnace slag and portland cement is advantageously used for harbor works, sewerage works, and wastewater treatment works because of its high long-term strength and high chemical resistivity, but has a drawback that care must be taken in curing due to poor surface hardening. Accordingly, there has been strong demand for a good hardening composition which can replace granulated blast furnace slag.

Meanwhile, large cities in particular have various waste-related problems such as treatment of sludge and municipal refuse and securing of a final disposal yard for various industrial wastes, including construction waste. Thus, various investigations and research efforts regarding recycling of such wastes are actively under way.

Individual municipalities and apparatus manufacturers are developing technology for utilizing ashes which remain after sludge and municipal refuse are incinerated in order to reduce their volume, as well as technology for utilizing fused slag which is obtained when such ashes are melted in order to further reduce their volume. The thus-obtained slag has begun to be used as material for roadbeds, aggregate of blocks, tiles, bricks, etc., but usage is on a very small scale due to technical and price-related restrictions and a distribution problem. Such slag is not at a stage of intensive utilization, but still constitutes a headache for municipalities in that they must somehow dispose of it.

Regarding sludge, since 1975 the Ministry of Construction has been conducting investigations and research efforts for recycling of sludge. Also, the Ministry of Construction subsidizes facilities for utilizing sludge in order to promote utilization of sludge. Further, since 1988 the Ministry of Construction has been carrying out a model project for utilization of sludge resource wherein sludge products (roadbed material, soil conditioner, etc.) are positively used in sewerage construction works.

Despite such long-term studies on utilization of sludge and refuse, utilization of sludge-incinerated ashes and refuse-incinerated ashes as well as their fused slag have not yet been remarkably implemented.

DISCLOSURE OF THE INVENTION

In order to find new hydraulic material which can replace granulated blast furnace slag, the inventor has conducted various studies on composition and hardening performance of fused slags produced from incineration ashes of various wastes. Unexpectedly, despite having a CaO content of not more than 37 wt. %, most fused slags produced from sludge- and refuse-incinerated substances showed good hydraulicity when alkali activators were added thereto, providing a hardened product having excellent strength. As a result of further study, it was found that a slag composition having a certain composition showed good hydraulicity through addition of alkali activators, providing a hardened product having excellent strength and thus leading to the achievement of the present invention.

Accordingly, the present invention provides a hardening composition characterized by comprising:
 (A) a slag composition containing 0 to 37 wt. % of CaO, 23 to 90 wt. % of $SiO_2$, and 0 to 40 wt. % of $Al_2O_3$ and 0.1 to 50 wt. % of one or more compounds selected from the group consisting of iron oxide, alkali components, a phosphorous component, titanium dioxide, manganese oxide, and magnesium oxide, and/or 0.1 to 10 wt. % of a halogen; and
 (B) an alkaline activators.

The present invention also provides a hardening composition characterized by containing:
 (A') a slag composition selected from the group consisting of fused slag produced from a sludge-incinerated substance, fused slag produced from a refuse-incinerated substance, and fused slag produced from an industrial waste-incinerated substance; and
 (B) an alkaline activators.

BEST MODE FOR CARRYING OUT THE INVENTION

The slag composition (A) used in the present invention is a slag composition obtained by melting at high temperature a mixture of various materials such as clay, limestone, a sludge-incinerated substance, a refuse-incinerated substance, and industrial waste, which are mixed so as to attain the above-described chemical composition, and then quenching the melt. This mixture may be of commercially available materials. However, since most sludge-incinerated substances, refuse-incinerated substances, and industrial wastes have a chemical composition falling within the above-described range, it is preferable that they are used directly, in view of economy and utilization of available resources.

The CaO content of the slag composition (A) is 0 to 37 wt. %, preferably 1 to 37 wt. %, particularly preferably 1 to 35 wt. %. The $SiO_2$ content is 23 to 90 wt. %, preferably 23 to 90 wt. %, particularly preferably 25 to 90 wt. %. The $Al_2O_3$ content is 0 to 40 wt. %, preferably 1 to 40 wt. %, particularly preferably 10 to 30 wt. %.

Also, in the slag composition (A), the weight ratio of $CaO/SiO_2$ is important for the development of strength of a hardened product, and is preferably not more than 1.3, more preferably not more than 1.1, most preferably not more than 1.0.

Further, the slag composition (A) contains a total of 0.1 to 50 wt. % of one or more compounds selected from the group consisting of iron oxide (in terms of $Fe_2O_3$), alkali components (in terms of a total of $Na_2O$ and $K_2O$, a phosphorous component (in terms of $P_2O_5$), titanium dioxide (in terms of $TiO_2$), manganese oxide (in terms of MnO), and magnesium oxide (in terms of MgO) and/or 0.1 to 10 wt. % of a halogen component. Here, one or more compounds of iron oxide, alkali components, phosphorous components, titanium dioxide, manganese oxide, and magnesium oxide may be contained in a total amount of 0.1 to 50 wt. %, but are preferably contained in a total amount of 0.5 to 50 wt. %, particularly preferably 5 to 50 wt. % in view of development of strength of a hardened product. One or more of these components may be contained in a total amount of 0.1 to 50 wt. %, but preferably, contents of individual components fall in the following ranges: iron oxide 0 to 20 wt. %, an alkali component 0 to 30 wt. %, a phosphorous component 0 to 25 wt. %, titanium dioxide 0 to 20 wt. %, manganese oxide 0 to 10 wt. %, and magnesium oxide 0 to 15 wt. %.

Iron oxide may be contained in an amount of 0 to 20 wt. %, but is preferably contained in an amount of 0.5 to 20 wt. %. An alkali component may be contained in an amount of 0 to 30 wt. %, but is preferably contained in an amount of 0.1 to 20 wt. %, more preferably 1 to 10 wt. %. A phosphorous component may be contained in an amount of 0 to 25 wt. %, but is preferably contained in an amount of 0.5 to 10 wt. %. Titanium oxide may be contained in an amount of 0 to 20 wt. %, but is preferably contained in an amount of 0.1 to 20 wt. %. Manganese oxide may be contained in an amount of 0 to 10 wt. %, but is preferably contained in an amount of 0.1 to 5 wt. %. Magnesium oxide may be contained in an amount of 0 to 15 wt. %, but is preferably contained in an amount of 1 to 10 wt. %.

Examples of the halogen include fluorine and chlorine, with fluorine being particularly preferred. Halogenous content is 0.1 to 10 wt. %, preferably 0.1 to 8 wt. %, particularly preferably 0.5 to 7.5 wt. %.

There may be contained either a halogen or one or more compounds selected from the group consisting of iron oxide, alkali components, phosphorous components, titanium dioxide, manganese oxide, and magnesium oxide, but both may be contained. Of course, when both are contained, their contents may fall in the above-described smaller ranges.

In addition to the above-described components, the slag composition (A) may also contain a small amount to a trace amount of $B_2O_3$, $SO_3$, copper oxide, $SnO_2$, and $ZnO_2$.

As previously described, the fused slag produced from a sludge-incinerated substance and the fused slag produced from a refuse-incinerated substance may not contain a Ca component. Fused slag which contains a very small amount of a Ca component or no Ca components is considered suitable for being mixed, particularly with portland cement to make mixed cement.

In view of formation of a C-S-H hydrate, which is considered highly effective for development of strength, fused slag preferably contains a Ca component.

Fused slag produced from a refuse-incinerated substance and fused slag produced from a sludge-incinerated substance preferably contain a Ca component in an amount of 1 to 37 wt. % in terms of CaO, more preferably 1 to 35 wt. %, most preferably 8 to 35 wt. %. Since fused slag produced from a refuse- or sludge-incinerated substance normally contains a large amount of iron and alkali in distinction from blast furnace slag, even when the CaO content exceeds 37 wt. %, the fused slag results in hardening material, but the resultant hardening material may be highly likely to become a hard-to-vitrify composition due to a relatively low content of silica and a phosphate component which are glass-forming oxides, or may become a quick-setting compound or a compound having poor development of strength. Further, formation of fused slag generally requires high temperatures and thus requires much incineration energy. This accompanies an undesirable phenomenon that furnace material sharply becomes susceptible to erosion as the furnace temperature increases. In such an event, mixing fused slag with portland cement is preferable in many cases.

Of course, through adjustive addition of $SiO_2$, CaO, $Al_2O_3$, etc., a composition similar to a high-CaO type blast furnace slag composition can be obtained.

However, since a composition of the present invention can be a good hardening composition and can provide a good hardened product without increasing the CaO content, when material for slag is of a relatively high CaO content and a relatively low $SiO_2$ content, $SiO_2$, for example, may be added to the material to thereby promote vitrification and to reduce the relative CaO content ($1 \geq C/S$). The thus-prepared material is slagged to thereby remedy the above-described problem. In this case, since there is a preferable aspect that the thus-produced slag absorbs alkali components and calcium hydroxide, a component having an unnecessarily high CaO content is rather not preferable.

A blast furnace slag having a CaO content of 40 wt. % or more is not so unique. According to studies on blast furnace slag-related compositions which had been conducted by many researchers, a blast furnace slag composition having a high activity of hydration and good development of strength is a 4-component composite slag composition composed of $SiO_2$, $Al_2O_3$, CaO, and MgO, which are principal components of blast furnace slag and are contained in the following composition: $SiO_2$ 31.28 wt. %, $Al_2O_3$ 15.48 wt. %, CaO 49.08 wt. %, and Mgo 4.69 wt. %. As reported by these researchers, blast furnace slag compositions having a high CaO content have a high activity of hydration. In actual blast furnace slag compositions, it is known that when a CaO content reduces below about 35 wt. %, its activity of reaction significantly decreases. By contrast, a fused slag composition shows a high activity of reaction not only when the CaO content thereof is about 35 wt. %, but also when the CaO content is as low as about 8 wt. % which is inconceivably low in view of conventional sense of research, and further even when no CaO is contained. This also indicates that fused slag of the present invention is significantly different from conventional blast furnace slag. A fused slag composition which contains 0 to 8 wt. % of CaO is preferably mixed with portland cement serving as an alkaline activator to thereby be used in the form of mixed cement.

For the above-described reason, the present invention limits a CaO content to the aforementioned range.

The above-described slag preferably contains an alumina component in an amount of 0 to 40 wt. %, particularly preferably 10 to 30 wt. %. An alumina content is limited to such a range because an alumina content exceeding 40 wt. % causes a failure to obtain a hardened product having good development of hardness, and slagging requires very high temperatures. Also, even when no alumina component is contained, a hardening composition is obtainable. This is another reason why an alumina content is limited to the above-described range. When zeolite is to be generated through hydration of slag of the present invention, alumina is preferably contained to some extent, more preferably in an amount of 10 to 30 wt. %.

The silica content of a slag composition of the present invention is 23 to 90 wt. %. When the silica content reduces below 23 wt. %, slagging (vitrification) becomes difficult to attain, and then reduces the production of calcium silicate hydrate which is indispensable to secure development of strength, resulting in poor development of strength. On the contrary, when the silica content exceeds 90 wt. %, slagging (vitrification) requires high temperatures, resulting in difficulty in slagging.

The above-described fused slag preferably contains a P component.

Particularly, preferable are fused slag produced from a sludge-incinerated substance and fused slag produced from a municipal refuse-incinerated substance which contain a P component in an amount of 0 to 25 wt. % (particularly 1 to 10 wt. %) in $P_2O_5$. The content of a P component is limited to the above-described range because when the content of a P component exceeds 25 wt. %, the content of other components effective for hardening and development of strength relatively reduces, resulting in the difficulty of obtaining a good hardened product.

The above-described fused slag produced from a sludge-incinerated substance preferably contains Na and/or K components (alkali components).

Particularly, preferable are fused slag produced from a refuse-incinerated substance and fused slag produced from a sludge-incinerated substance which contain Na and K components in an amount of 0 to 30 wt. % in terms of a total of $Na_2O$ and $K_2O$, more preferably 0.1 to 30 wt. %, most preferably 1 to 10 wt. %. When the alkali content exceeds 30 wt. %, development of strength deteriorates, and an alkali component becomes more likely to be eluted from a hardened product, resulting in deterioration of durability of the hardened product. When a slag composition used in the present invention is mixed with portland cement serving as an activator to thereby form so-called mixed cement, a relatively high alkali content has an adverse effect particularly on long-term strength. Thus, although balance with other components must be considered, the alkali content of the slag composition is preferably not more than 10 wt. %.

Generally, the above-described fused slag produced from a sludge-incinerated substance and like slag preferably contain an Fe component. Fused slag produced from a refuse-incinerated substance and fused slag produced from a sludge-incinerated substance preferably contain an Fe component in an amount of 0 to 20 wt. % (particularly 0.5 to 20 wt. %) in terms of $Fe_2O_3$. An Fe component produces a good effect of making a glass structure unstable and decreasing a fusion temperature, i.e. burning energy, but has a significantly adverse effect on development of strength when the content thereof exceeds 20 wt. %.

The above-described fused slag produced from a sludge-incinerated substance and like slag preferably contain an Mg component in an amount of 0 to 15 wt. % (particularly 1 to 10 wt. %) in terms of MgO. An Mg component also produces a good effect of making a glass structure unstable to thereby activate slag, but has an adverse effect on development of strength when the content thereof exceeds 15 wt. %.

The above-described fused slag produced from a sludge-incinerated substance and like slag preferably contain a Ti component in an amount of 0 to 20 wt. % (particularly 0.1 to 20 wt. %) in terms of $TiO_2$. A Ti component also produces a good effect of making a glass structure unstable to thereby activate slag, but has an adverse effect on development of strength and economically produces an disadvantageous effect when the content thereof exceeds 20 wt. %.

The above-described fused slag produced from a sludge-incinerated substance and like slag preferably contain an Mg component in an amount of 0 to 10 wt. % (particularly 0.1 to 5 wt. %) in terms of MnO. An Mg component also produces a good effect of making a glass structure unstable to thereby activate slag, but has an adverse effect on development of strength and economically produces an disadvantageous effect when the content thereof exceeds 10 wt. %.

The above-described fused slag produced from a sludge-incinerated substance and like slag preferably contains a halogen (fluorine and chlorine) in an amount of 0 to 10 wt. %, more preferably 0.1 to 8 wt. %, most preferably 0.5 to 7.5 wt. %. A halogen also produces a good effect of making a glass structure unstable to thereby activate slag, but has an adverse effect on development of strength and economically produces an disadvantageous effect when the content thereof exceeds 10 wt. %. Examples of a halogen include fluorine, chlorine, bromine, etc., but generally fluorine is preferable because chlorine and bromine have the property of corroding reinforcing bars.

As previously described, the slag composition (A) used in the present invention is obtained by melting at high temperatures a mixture of various materials which are mixed so as to attain the above-described chemical composition, and quenching the resulting melt. The slag composition (A) can also be manufactured by slagging a sludge-incinerated substance, a refuse-incinerated substance, or industrial waste.

A sludge-incinerated substance is obtained by dehydrating sludge by various methods. Examples of a sludge-incinerated substance include lime-based sludge-incinerated ashes which are prepared using slaked lime or the like as a dehydration aid, and polymer-based sludge-incinerated ashes which are prepared using polymeric flocculent as a dehydration aid. An example of a refuse-incinerated substance is a normal municipal refuse-incinerated substance. Industrial waste is waste other than municipal refuse. Examples of industrial waste include crushed stone sludge and waste concrete.

A melting temperature for these materials is not particularly limited, but is normally preferably 1200° to 1600° C. Melting is conducted in, for example, an electric fusion furnace such as an arc type fusion furnace, a plasma type fusion furnace, or an electric resistance type fusion furnace, or a gas- or like fuel-fired fusion furnace such as a reverberatory type surface fusion furnace or a radiation type surface fusion furnace. Examples of quenching means include water quenching and air quenching. Water quenching is particularly preferable.

When the thus-obtained slag composition (A) contains fused slag produced from a sludge-incinerated substance, fused slag produced from a refuse-incinerated substance, or fused slag produced from industrial waste, it normally has the following composition: 5 to 35 wt. % of CaO, 30 to 70 wt. % of $SiO_2$, 5 to 25 wt. % of $Al_2O_3$, 2 to 20 wt. % of iron oxide, 1 to 15 wt. % of an alkali component, 0.5 to 23 wt. % of a phosphorous component, 0.1 to 3 wt. % of titanium dioxide, 0.1 to 3 wt. % of manganese oxide, 2 to 6 wt. % of magnesium oxide, 0 to 5 wt. % of halogens, and 0 to 5 wt. % of $SO_3$.

More specifically, in the case of fused slag produced from a refuse-incinerated substance which mainly comprises normally occurring refuse-incinerated ashes, the contents of the above-described components are as follows: 7 to 35 wt. % of CaO, 30 to 70 wt. % of $SiO_2$, about 5 to 22 wt. % of $Al_2O_3$, 0.5 to 15 wt. % of $Fe_2O_3$, 0.5 to 6 wt. % of MgO, 2 to 15 wt. % of $Na_2O$ and $K_2O$ combined, 0.5 to 5 wt. % of $P_2O_5$, about 0.0 to 5 wt. % of halogens (chlorine, etc.), 0.0 to 5 wt. % of $SO_3$, 0.1 to 3 wt. % of manganese oxide, 2 to 6 wt. % of magnesium oxide, about 0.0 to 5 wt. % of halogens, 0.0 to 5 wt. % of $SO_3$, about 0.1 to 1 wt. % of MnO, and about 0.5 to 3 wt. % of $TiO_2$.

For fused slag produced from a sludge-incinerated substance, a CaO content falls in a range of about 5 to 35 wt. %. An $SiO_2$ content falls in a range of about 20 to 45 wt. %, normally 25 to 40 wt. %. An $Al_2O_3$ content falls in a range of about 5 to 25 wt. %, normally 10 to 20 wt. %. An MgO content falls in a range of about 2 to 5 wt. %, normally about 3 wt. % in many cases. For lime-based sludge-incinerated ashes, a $P_2O_5$ content falls in a range of about 1 to 10 wt. %, normally 5 to 10 wt. %; for polymer-based sludge-incinerated ashes, a $P_2O_5$ content falls in a range of about 7 to 23 wt. %, normally 7 to 20 wt. %. Alkali content falls in a range of about 1 to 5 wt. % in terms of a total of $Na_2O$ and $K_2O$, normally about 3 wt. % in many cases. An Fe content falls in a range of about 5 to 20 wt. % in terms of $Fe_2O_3$, normally about 10 wt. % in many cases.

The shape of the slag composition (A) used in the present invention is not particularly limited, but is preferably powdery, granular, or grain, more preferably powdery or granular depending on applications, percentage of use, mixing and forming conditions, etc. Particularly, the surface area is preferably not less than 2000 $cm^2/g$ in Blaine value, or the grain size of powder is preferably 0.1 to 5 mm.

An alkaline activator used in the present invention is one or more compounds selected from the group consisting of alkali metal hydroxides, alkaline earth metal hydroxides, and weak-acid alkaline metal salts. Examples of alkaline metal hydroxides include NaOH, KOH, and LiOH. Examples of alkaline earth metal hydroxides include $Ca(OH)_2$ and $Mg(OH)_2$. Examples of weak-acid alkaline metal salts include sodium carbonate, potassium carbonate, sodium silicate, potassium silicate, sodium aluminate, and potassium aluminate. Also, since portland cement contains a small amount of alkali silicate and aluminosilicate and produces $Ca(OH)_2$ through hydration thereof, it can be an alkaline activator. Here, portland cement is not limited to normal portland cement, but can be of an early-strength type and a low heat-generation type.

In the present invention, an appropriate mixing ratio between the slag composition (A) and the alkaline activator (B) varies depending on the chemical composition of slag and is not particularly limited. For example, the ratio between the slag composition (A) and an alkaline activator is preferably as follows: 0.01 to 10 parts by weight of an alkaline activator to 100 parts by weight of the slag composition (A) when an alkaline metal compound is used as an alkaline activator; and 3 to 100 parts by weight of an alkaline activator to 100 parts by weight of the slag composition (A) when an alkaline earth metal compound is used as an alkaline activator.

Since portland cement itself is a source of alkali and calcium hydroxide, when a portland cement composition is used as an alkaline activator, portland cement can be considered as a combination of the above-described alkaline activator and an alkaline earth metal compound. Further, since portland cement itself has a setting property, there is no upper limitation to the amount of portland cement used to obtain a hardened product, i.e. portland cement can be mixed in a large amount. However, since a mixture of the slag composition (A) of the present invention and portland cement is a so-called mixed cement composition, they are preferably mixed at the following general ratio: about 0.1 to 60 parts by weight of the slag composition (A) to 100 parts by weight of portland cement.

A hardening composition of the present invention may also contain materials other than the above-described slag composition (A) and the alkaline activator (B). Examples of such materials include $SO_3$, blast furnace slag, and fly ash.

As previously described, a hardening composition of the present invention has good hydraulicity, it can be formed into a hardened product having excellent strength merely through mixture with water. Specifically, the aforementioned hardening composition is mixed with water, and the resulting mixture is cured to set, obtaining a hardened product having excellent strength. Also, the aforementioned hardening composition is mixed with water and aggregate, and the resulting mixture is cured to harden, obtaining a hardened product. Curing conditions are not particularly limited, but curing is preferably performed at a temperature of 60° to 80° C. for 4 to 24 hours. Like portland cement, slag of a properly prepared composition may also be cured at room temperature to obtain a good hardened product. Applicable aggregate includes not only slag of the present invention but also aggregate for use in normal concrete, mortar, block products, and construction materials. Examples of such aggregate include sand, gravel, crushed stone, and lightweight aggregate.

A detailed scientific illumination of why a mixture of fused slag produced from a sludge-incinerated substance or fused slag produced from a municipal refuse-incinerated substance and an alkaline activator (including portland cement) hardens is left to a future study. The present inventor analyzed the reason as follows.

Fused slag produced from a sludge-incinerated substance and fused slag produced from a municipal refuse-incinerated substance are rich in not only $SiO_2$, which is a glass-forming oxide, but also $Al_2O_3$ and CaO and further iron components ($Fe_2O_3$, etc.), MgO, alkalis ($Na_2O$, $K_2O$), a phosphorous component ($P_2O_5$), and also contain a sulfur (S) component, a manganese component, and $TiO_2$. Further, municipal refuse-incinerated ashes contain a halogen (particularly chlorine, Cl).

That is, not only a quantitative relation among a silica component, a calcium component, an alumina component, and a magnesium component, which are principal components of blast furnace slag, but also an iron component, a phosphorous component ($P_2O_5$), an alkali component, manganese, etc., which are rarely or very slightly contained in blast furnace slag, have a great effect on reactivity of fused slag produced from a sludge-incinerated substance and fused slag produced from municipal refuse-incinerated substance. Alkali, an iron component, a phosphorous component, and halogens (chlorine, fluorine, etc.) are particularly influential.

Since fused slag produced from a sludge-incinerated substance and fused slag produced from a municipal refuse-incinerated substance are substantially glass, the glass structure of fused slag produced from a sludge-incinerated substance and fused slag produced from a municipal refuse-incinerated substance is made unstable through disturbance or partial cutting of the glass structure of silica ($SiO_2$), which is a glass-forming oxide. As a result, the glass structure becomes susceptible to erosion particularly in an alkaline environment. Components which are eluted through erosion hydrate with, for example, calcium hydroxide which is generated through hydration of portland cement, thereby forming compounds such as zeolite which is a compound of calcium silicate hydrate (C—S—H), alkali (calcium)-alumina-silica, etc. Thus, strength is developed.

That is, the glass structure of fused slag produced from a sludge-incinerated substance is considered to have, for example, a chain structure represented by —Si—O—Fe—O—Si—O—Al—O—P—O— formed through coupling of silica with alumina, iron, phosphoric acid, etc. Fused slag produced from a sludge-incinerated substance contains less $SiO_2$ than normal soda-lime-based glass and aluminosilicate glass, and thus the glass structure thereof is likely to become unstable. Moreover, fused slag produced from a sludge-incinerated substance contains not only modifier oxides such as $Na_2O$, $K_2O$, calcium oxide (CaO), alumina ($Al_2O_3$), and magnesium oxide (MgO) which are contained in normal soda-lime-based glass and aluminosilicate glass, but also iron components ($Fe_2O_3$ and FeS), a phosphorous component ($P_2O_5$), manganese oxide (MnO), sulfur (S), and titania ($TiO_2$), which are rarely or not much contained in normal glass and which are considered to further make the glass structure unstable. Like glass which contains, for example, a phosphorous component ($P_2O_5$) is known to be unstable and susceptible to alkali and water, once a phosphorous component ($P_2O_5$), alkalis, iron, calcia, magnesia, and alumina, etc. enter the glass structure, they produce a composite effect of making the glass structure unstable. As a result, the structure of the coupling chain of silica, which is a glass-forming oxide, is further disturbed to deform or partially break. Thus, the glass structure is in an unstable state which is not observed with the normal glass structure such as the structure of window glass, i.e. the glass structure is in an "activated, highly reactive" state. However, in the case of a phosphorous component, addition of alumina to phosphate glass further stabilizes the glass structure for a certain region. Therefore, alkali components, iron, etc. are considered to produce a relatively high composite effect of making the glass structure unstable.

When fused slag in such an unstable glass state is combined with alkali materials such as alkali hydroxide, soda silicate (water glass), portland cement, etc., the slag readily erodes, and consequently ions and compounds of slag components such as Si, Al, Mg, Fe, and P are eluted to form hydrates. Thus, the mixture hardens. This is a hardening mechanism that the inventor conjectures.

For example, when water is added to a mixture of the aforementioned slag composition and portland cement which has been widely used as cement concrete material, there are formed insoluble compounds such as calcium silicate hydrate (C—S—H), zeolite, etc., which are formed through hydration between calcium hydroxide generated through hydration of portland cement and silica, alumina, etc. from the slag composition. Thus, the mixture hardens.

A composition which forms silicate compounds such as zeolite, which are hydrate compounds of alkali components, alumina, silica, etc., is considered to be slag having a $CaO/SiO_2$ mole-ratio (C/S) of below about 1.2. As the C/S ratio increases, formation of aluminate compounds may become dominant as observed with blast furnace slag.

That is, the hydration of normal blast furnace slag (normally C/S>1.3) with blast furnace cement, which is mixed cement of portland cement and blast furnace slag, is known to produce the above-described calcium silicate hydrate (C—S—H), calcium sulfoaluminate hydrate, calcium aluminate hydrate, etc. For fused slag produced from a sludge-incinerated substance and fused slag produced from a municipal refuse-incinerated substance, the ratio between calcium (C) and silica (S) (C/S mole-ratio) is generally lower than that of blast furnace slag (mostly C/S≧1.3), normally not more than about 1.15, mostly not more than 1. Accordingly, calcium is too short to produce a calcium aluminate hydrate, and thus silicate compounds such as zeolite are formed.

However, for fused slag produced from a lime-based sludge-incinerated substance, which is prepared using lime as a dehydrator, the C/S ratio exceeds 1.2 in some cases. In such a case, like blast furnace slag, calcium aluminate hydrate may be formed, resulting in likelihood of poor surface hardening, which is a drawback of blast furnace slag. Thus, when the alumina content of a slag composition is relatively high, using alkali silicate having a silica source, such as soda silicate, as a stimulator may prevent formation of an aluminate-based hydrate and may bring formation of silicate compounds. In this case, alkali silicate such as water glass rather than alkali hydroxide is suited to be an alkaline activator. However, when the C/S ratio is excessively high, fused slag, together with portland cement, may be used in the form of mixed cement.

When fused slag produced from a sludge-incinerated substance or fused slag produced from a municipal refuse-incinerated substance having a relatively low C/S ratio is used with portland cement serving as an activator particularly when used in the form of mixed cement, a calcium content is too low to produce calcium aluminate hydrate. This has been confirmed through X-ray analysis of hydrate. It has also been confirmed that calcium hydroxide is hardly produced (hardly remains) for a certain usage of fused slag.

For a composition having a low C/S ratio, a zeolite compound is likely to be produced. Thus, there is an extreme case where such a composition hardly hardens when the usage of an alkaline activator such as NaOH is too small, due to absorption of entire alkalis, but shows a good development of strength when the usage of an activator is increased. It is therefore apparent that a hardening composition of the present invention has a high capability of absorbing and fixing NaOH, $Ca(OH)_2$, etc.

Thus, for example, by mixing a hardening composition of the present invention with an appropriate amount of portland cement serving as an alkaline activator, there can be formed a hardened product in which the production of calcium hydroxide is suppressed or even prevented. Accordingly, this mixture has a potential for solving the problems of efflorescence and alkali-aggregate reaction which are observed with a conventional portland cement-hardened product. Further, since the mixture reactively absorbs alkali components, which have an adverse effect on glass fiber, and also reactively absorbs calcium hydroxide to thereby reduce or prevent the production of calcium hydroxide, the mixture can be used as cement for glass fiber reinforced concrete products. As compared with conventional portland cement, the mixture provides a hardened product having excellent acid resistance and sea water resistance, and thus has a potential for application to structures which are required to be corrosion resistant, such as marine structures and sewer pipes.

A specific hardening mechanism is still unknown, but in distinction from blast furnace slag, even a slag composition which contains very little or no CaO provides a hardening composition which provides good development of strength, through combined use of the slag combination with an alkaline stimulator such as alkali hydroxide, alkali silicate, portland cement, or the like.

EXAMPLES

The present invention will next be described by way of example, which should not be construed as limiting the invention.

Examples 1—1 to 1–64 and Comparative Examples 1—1 to 1–11:

A sample was prepared so as to have a composition shown in Tables 1 to 5, using special grade chemicals from Kanto Kagaku Co., Ltd. The thus-prepared sample was melted by heating at a temperature of 1200° to 1500° C. for 60 minutes and at a temperature of 1250° to 1550° C. for 60 minutes. When a melt had too high a viscosity to flow out or when vitrification seemed to be insufficient, additional heating was performed at a temperature of 1300° to 1580° C. for 10 to 20 minutes. Subsequently, the resulting melt was led into water to be quenched, thereby obtaining fused slag.

The thus-obtained fused slag was pulverized in a ball mill to a fineness of 3000 cm$^2$/g and 4500 cm$^2$/g in Blaine value. To 85 parts by weight of the thus-pulverized material, were added 255 parts by weight of standard sand to be used in an ISO mortar strength test, sodium hydroxide as an alkaline activator in an amount shown in Tables 1 to 5, and 42.5 parts by weight of water. The resultant mixture was mixed in a Hobart mixer. The mixed mixture was charged into a mold for forming a sample having a size of 2 cm×2 cm×8 cm to be used in a strength test, while vibration was applied to the frame.

The charged mold was placed in a thermostat-hygrostat chamber (manufactured by Tabai) which was set to a temperature of 50° C. Subsequently, the temperature of the chamber was raised from 20° C. to 80° C. over 3 hours at a relative humidity of 98%, and subsequently the chamber was maintained at 80° C. for 12 hours (curing time), thereby obtaining a sample.

Tables 1 to 4 show measurements of compressive strength for each of the thus-obtained samples.

TABLE 1

| | Composition of fused slag (wt. %) | | | | | | | | C/S ratio | Amount of NaOH added (wt. %) | Compressive strength (kgf/cm$^2$) Curing time 12 hours |
|---|---|---|---|---|---|---|---|---|---|---|---|
| | SiO$_2$ | CaO | Al$_2$O$_3$ | Fe$_2$O$_3$ | MgO | Na$_2$O | P$_2$O$_5$ | F | | | |
| C. Ex. 1-1 | 39.2 | 45.8 | 15 | 0 | 0 | 0 | 0 | 0 | 1.25 | 3 | 81.5 |
| C. Ex. 1-2 | 39.2 | 45.8 | 15 | 0 | 0 | 0 | 0 | 0 | 1.25 | 7 | 131 |
| C. Ex. 1-3 | 44.0 | 41.0 | 15 | 0 | 0 | 0 | 0 | 0 | 1.00 | 3 | 65.9 |
| C. Ex. 1-4 | 50.0 | 35.0 | 15 | 0 | 0 | 0 | 0 | 0 | 0.75 | 3 | 133.5 |
| C. Ex. 1-5 | 50.0 | 35.0 | 15 | 0 | 0 | 0 | 0 | 0 | 0.75 | 7 | 138.1 |
| C. Ex. 1-6 | 50.0 | 35.0 | 15 | 0 | 0 | 0 | 0 | 0 | 0.75 | 10 | 129.5 |
| C. Ex. 1-7 | 58.0 | 27.0 | 15 | 0 | 0 | 0 | 0 | 0 | 0.50 | 3 | 150.5 |
| C. Ex. 1-8 | 58.0 | 27.0 | 15 | 0 | 0 | 0 | 0 | 0 | 0.50 | 7 | 130.4 |
| C. Ex. 1-9 | 68.9 | 16.1 | 15 | 0 | 0 | 0 | 0 | 0 | 0.25 | 3 | 33.5 |
| Ex. 1-1 | 39.5 | 45.0 | 15 | 0 | 0 | 0 | 0 | 0.5 | 1.25 | 3 | 148.4 |
| Ex. 1-2 | 36.9 | 43.1 | 15 | 0 | 0 | 0 | 0 | 5.0 | 1.25 | 3 | 283.1 |
| Ex. 1-3 | 35.8 | 41.7 | 15 | 0 | 0 | 0 | 0 | 7.5 | 1.25 | 3 | 183.2 |
| Ex. 1-4 | 49.9 | 35.0 | 15 | 0 | 0 | 0 | 0 | 0.1 | 0.75 | 7 | 183.3 |
| Ex. 1-5 | 49.4 | 34.6 | 15 | 0 | 0 | 0 | 0 | 1 | 0.75 | 7 | 506.8 |
| Ex. 1-6 | 47.1 | 32.9 | 15 | 0 | 0 | 0 | 0 | 5 | 0.75 | 7 | 285.6 |
| Ex. 1-7 | 44.1 | 30.9 | 15 | 0 | 0 | 0 | 0 | 10 | 0.75 | 15 | 140.1 |
| Ex. 1-8 | 49.4 | 34.6 | 15 | 1 | 0 | 0 | 0 | 0 | 0.75 | 3 | 188.5 |
| Ex. 1-9 | 47.1 | 32.9 | 15 | 5 | 0 | 0 | 0 | 0 | 0.75 | 3 | 160.7 |
| Ex. 1-10 | 44.1 | 30.9 | 15 | 10 | 0 | 0 | 0 | 0 | 0.75 | 7 | 146.2 |
| Ex. 1-11 | 38.2 | 26.8 | 15 | 20 | 0 | 0 | 0 | 0 | 0.75 | 10 | 233.1 |
| C. Ex. 1-10 | 32.4 | 22.6 | 15 | 30 | 0 | 0 | 0 | 0 | 0.75 | 10 | 33.6 |
| Ex. 1-12 | 49.4 | 34.6 | 15 | 0 | 1 | 0 | 0 | 0 | 0.75 | 3 | 174.7 |
| Ex. 1-13 | 47.1 | 32.9 | 15 | 0 | 5 | 0 | 0 | 0 | 0.75 | 3 | 170.3 |
| Ex. 1-14 | 44.1 | 30.9 | 15 | 0 | 10 | 0 | 0 | 0 | 0.75 | 3 | 161.0 |

Note) C. Ex.: Comparative Example

TABLE 2

| Ex. 1-15 | 41.2 | 28.8 | 15 | 0 | 15 | 0 | 0 | 0 | 0.75 | 3 | 146.2 |
|---|---|---|---|---|---|---|---|---|---|---|---|
| C. Ex. 1-11 | 38.2 | 26.8 | 15 | 0 | 20 | 0 | 0 | 0 | 0.75 | 3 | 116.3 |
| Ex. 1-16 | 49.9 | 35.0 | 15 | 0 | 0 | 0.1 | 0 | 0 | 0.75 | 3 | 144.1 |
| Ex. 1-17 | 49.9 | 34.6 | 15 | 0 | 0 | 1 | 0 | 0 | 0.75 | 7 | 183.2 |
| Ex. 1-18 | 47.1 | 32.9 | 15 | 0 | 0 | 5 | 0 | 0 | 0.75 | 3 | 167.4 |
| Ex. 1-19 | 44.1 | 30.9 | 15 | 0 | 0 | 10 | 0 | 0 | 0.75 | 3 | 176.9 |
| Ex. 1-20 | 38.2 | 26.8 | 15 | 0 | 0 | 20 | 0 | 0 | 0.75 | 3 | 198.0 |
| Ex. 1-21 | 32.4 | 22.6 | 15 | 0 | 0 | 30 | 0 | 0 | 0.75 | 3 | 246.8 |
| Ex. 1-22 | 44.1 | 30.9 | 15 | 0 | 5 | 5 | 0 | 0 | 0.75 | 3 | 175 |
| Ex. 1-23 | 43.5 | 30.5 | 15 | 0 | 5 | 5 | 1 | 0 | 0.75 | 7 | 173 |
| Ex. 1-24 | 41.2 | 28.8 | 15 | 0 | 5 | 5 | 5 | 0 | 0.75 | 3 | 246.8 |
| Ex. 1-25 | 38.2 | 26.8 | 15 | 0 | 5 | 5 | 10 | 0 | 0.75 | 3 | 237.8 |
| Ex. 1-26 | 48.2 | 33.8 | 15 | 1 | 0 | 1 | 1 | 0 | 0.75 | 3 | 208 |

TABLE 2-continued

| Ex. | SiO₂ | CaO | Al₂O₃ | TiO₂ | MnO | | | | C/S ratio | | Compressive strength |
|---|---|---|---|---|---|---|---|---|---|---|---|
| Ex. 1-27 | 48.2 | 33.8 | 15 | 1 | 0 | 1 | 1 | 0 | 0.75 | 3 | 169 |
| Ex. 1-28 | 45.3 | 31.7 | 15 | 1 | 5 | 1 | 1 | 0 | 0.75 | 3 | 179.6 |
| Ex. 1-29 | 45.3 | 31.7 | 15 | 1 | 5 | 1 | 1 | 0 | 0.75 | 7 | 169 |
| Ex. 1-30 | 45.9 | 32.1 | 15 | 1 | 5 | 1 | 0 | 0 | 0.75 | 3 | 160.8 |
| Ex. 1-31 | 45.9 | 32.1 | 15 | 1 | 5 | 0 | 1 | 0 | 0.75 | 3 | 160.2 |
| Ex. 1-32 | 45.9 | 32.1 | 15 | 0 | 5 | 1 | 1 | 0 | 0.75 | 3 | 172.7 |
| Ex. 1-33 | 36.2 | 33.8 | 10 | 5 | 5 | 5 | 2.5 | 2.5 | 1.00 | 3 | 434.3 |
| Ex. 1-34 | 33.6 | 31.4 | 15 | 5 | 5 | 5 | 2.5 | 2.5 | 1.00 | 3 | 338.0 |
| Ex. 1-35 | 31.0 | 29.0 | 20 | 5 | 5 | 5 | 2.5 | 2.5 | 1.00 | 3 | 264.7 |
| Ex. 1-36 | 50.0 | 35.0 | 0 | 0 | 5 | 5 | 5 | 0 | 0.75 | 3 | 287.8 |
| Ex. 1-37 | 41.2 | 28.8 | 15 | 0 | 5 | 5 | 5 | 0 | 0.75 | 3 | 246.8 |
| Ex. 1-38 | 29.4 | 20.6 | 30 | 0 | 5 | 10 | 5 | 0 | 0.75 | 10 | 287.8 |

TABLE 3

| Ex. | SiO₂ | CaO | Al₂O₃ | TiO₂ | MnO | | | | C/S ratio | | Compressive strength |
|---|---|---|---|---|---|---|---|---|---|---|---|
| Ex. 1-39 | 36.8 | 25.7 | 15 | 5 | 5 | 10 | 0 | 2.5 | 0.75 | 1 | 224.7 |
| Ex. 1-40 | 36.8 | 25.7 | 15 | 5 | 5 | 10 | 0 | 5 | 0.5 | 3 | 480.3 |
| Ex. 1-41 | 44.5 | 30.9 | 10 | 5 | 5 | 5 | 0 | 0 | 0.75 | 3 | 308.4 |
| Ex. 1-42 | 41.2 | 28.8 | 15 | 5 | 5 | 5 | 0 | 0 | 0.75 | 3 | 162.1 |
| Ex. 1-43 | 47.1 | 32.9 | 0 | 5 | 5 | 5 | 5 | 0 | 0.75 | 3 | 227.4 |
| Ex. 1-44 | 38.2 | 26.8 | 15 | 5 | 5 | 5 | 5 | 0 | 0.75 | 3 | 251.2 |
| Ex. 1-45 | 35.3 | 24.7 | 20 | 5 | 5 | 5 | 5 | 0 | 0.75 | 3 | 195.4 |
| Ex. 1-46 | 48.5 | 34.0 | 0 | 5 | 5 | 5 | 0 | 2.5 | 0.75 | 3 | 243.5 |
| Ex. 1-47 | 42.6 | 29.9 | 10 | 5 | 5 | 5 | 0 | 2.5 | 0.75 | 3 | 368.1 |
| Ex. 1-48 | 39.7 | 27.8 | 15 | 10 | 5 | 5 | 0 | 2.5 | 0.75 | 3 | 387.6 |
| Ex. 1-49 | 36.8 | 25.7 | 20 | 5 | 5 | 5 | 0 | 2.5 | 0.75 | 3 | 302.3 |
| Ex. 1-50 | 25.0 | 17.5 | 40 | 5 | 5 | 5 | 0 | 2.5 | 0.75 | 7 | 183.2 |
| Ex. 1-51 | 25.0 | 17.5 | 40 | 5 | 5 | 5 | 0 | 2.5 | 0.75 | 10 | 296.7 |
| Ex. 1-52 | 47.1 | 32.9 | 0 | 5 | 5 | 5 | 2.5 | 2.5 | 0.75 | 3 | 198.2 |
| Ex. 1-53 | 41.2 | 28.8 | 10 | 5 | 5 | 5 | 2.5 | 2.5 | 0.75 | 3 | 291.2 |
| Ex. 1-54 | 38.2 | 26.8 | 15 | 5 | 5 | 5 | 2.5 | 2.5 | 0.75 | 3 | 305.2 |
| Ex. 1-55 | 35.3 | 24.7 | 20 | 5 | 5 | 5 | 2.5 | 2.5 | 0.75 | 3 | 176.3 |
| Ex. 1-56 | 44.3 | 20.7 | 15 | 5 | 5 | 5 | 2.5 | 2.5 | 0.50 | 3 | 214.8 |
| Ex. 1-57 | 34.1 | 15.9 | 30 | 5 | 5 | 5 | 2.5 | 2.5 | 0.50 | 7 | 332.0 |
| Ex. 1-58 | 32.4 | 7.6 | 40 | 5 | 5 | 5 | 2.5 | 2.5 | 0.25 | 10 | 221.9 |

TABLE 4

| | Composition of fused slag (wt. %) | | | | | | Amount of NaOH added (wt. %) | Compressive strength (kgf/cm²) Curing time 12 hours |
|---|---|---|---|---|---|---|---|---|
| | SiO₂ | CaO | Al₂O₃ | TiO₂ | MnO | C/S ratio | | |
| Ex. 1-59 | 47.1 | 32.9 | 15 | 5 | 0 | 0.75 | 3 | 224.3 |
| Ex. 1-60 | 44.1 | 30.9 | 15 | 10 | 0 | 0.75 | 10 | 495.5 |
| Ex. 1-61 | 38.2 | 26.8 | 15 | 20 | 0 | 0.75 | 10 | 362.0 |
| Ex. 1-62 | 38.2 | 26.8 | 15 | 20 | 0 | 0.75 | 15 | 358.4 |
| Ex. 1-63 | 47.1 | 32.9 | 15 | 0 | 5 | 0.75 | 3 | 151.9 |
| Ex. 1-64 | 44.1 | 30.9 | 15 | 0 | 10 | 0.75 | 10 | 144 |

As seen from Tables 1 to 4, hardening compositions of the present invention which contained the slag composition (A) that satisfied the aforementioned conditions and the alkaline activator (B) provided hardened products having excellent strength merely by adding water thereto and mixing and curing the resultant mixture.

Example 2-1

Lime-based sludge slag (material from Osaka Municipal Sewerage Corp. having the following major chemical composition (wt. %): SiO₂ 32.1, Al₂O₃ 14.1, Fe₂O₃ 4.5, CaO 34.4, MgO 2.4, P₂O₅ 8.0, S 1.2, Na₂O 0.80, K₂O 0.51, and others) was pulverized in 200 g portions in a disk mill for 10 minutes such that about 9 wt. % of residue was left on a 90 μm sieve and about 23 wt. % of residue was left on a 63 μm sieve. To 1600 parts by weight of the thus-pulverized material, were added 16 parts by weight of sodium hydroxide as an alkaline activator and 264 parts by weight of water. The resultant mixture was mixed in a Hobart mixer. The mixed mixture was charged into a mold for forming a sample having a size of 4 cm×4 cm×16 cm to be used in a strength test of normal portland cement mortar, while vibration was applied to the mold.

The charged mold was placed in a thermostat-hygrostat chamber (manufactured by Tabai) which was set to a temperature of 50° C. Subsequently, the temperature of the chamber was raised from 50° C. to 80° C. over about 20 minutes at a relative humidity of 98%, and subsequently the chamber was maintained at 80° C. for 2 hours (and 4 hours) (curing time), thereby obtaining a sample.

Example 2-2

The pulverized material of lime-based sludge slag of Example 2-1 was used to prepare a sample through mixing and curing under conditions similar to those of Example 1 except that the amount of NaOH was 48 parts by weight, thereby obtaining samples of 1-hour, 2-hour, 4-hour, and 22-hour curing at 80° C.

Example 2-3

The pulverized material of lime-based sludge slag of Example 2-1 was used to prepare a sample through mixing and curing under conditions similar to those of Example 1 except that the amount of NaOH was 48 parts by weight and the amount of mixing water was 224 parts by weight, thereby obtaining samples of 1-hour, 2-hour, 4-hour, and 22-hour curing at 80° C.

Example 2-4

The pulverized material of lime-based sludge slag of Example 2-1 was used to prepare a sample in a manner similar to that of Example 1 except that the amount of NaOH was 48 parts by weight and curing was conducted in a humid environment at a temperature of 20° C. for 1 day (and 3 days).

Example 2-5

The pulverized material of lime-based sludge slag of Example 2-1 was used to prepare a sample in a manner similar to that of Example 1 except that the amount of NaOH was 80 parts by weight and curing was conducted in a humid environment at a temperature of 20° C. for 1 day (and 3 days).

Example 2-6

Five (5) kinds of test materials were prepared in a manner similar to that of Examples 2-1 to 2-5 except that $Ca(OH)_2$ (first class grade chemical manufactured by Kanto Kagaku Co., Ltd.) in place of NaOH was used in an amount of 48 parts by weight, 160 parts by weight, 240 parts by weight, and 320 parts by weight, water was used in an amount of 264 parts by weight, 288 parts by weight, 335 parts by weight, and 352 parts by weight, respectively, and except that 1000 parts by weight of calcium hydroxide and 880 parts by weight of water were used with 1000 parts by weight of the pulverized material of sludge slag. Samples were obtained from the thus-prepared 5 kinds of test materials in a manner similar to that of Example 2-1. Curing time at 80° C. was 4 hours for all the samples.

Example 2-7

713 parts by weight of the pulverized material of lime-based sludge slag of Example 2-1, 1147 parts by weight of aggregate prepared by coarsely pulverizing the sludge slag to a grain size of 0.5 to 2.5 mm, 21.4 parts by weight of NaOH, and 168 parts by weight of water were mixed. Subsequently, a sample was obtained from the mixed mixture in a manner similar to that of Example 2-1. Curing time at 80° C. was 4 hours.

Example 2-8

The pulverized material of lime-based sludge slag of Example 2-1 was mixed and cured in a manner similar to that of Example 2 (except that curing time at 80° C. was 18 hours). The resultant hardened product was crushed. Subsequently, the crushed material was dried at a temperature of 110° C. for 1 day. Then, 200 g of the crushed material was pulverized in a disk mill for 3 minutes (residue on a 90 $\mu$m sieve: 14.6 wt. %). To 1200 parts by weight of the thus-pulverized material, was added 228 parts by weight of water. The resultant mixture was mixed in a Hobart mixer. Subsequently, a sample was obtained in a manner similar to that of Example 2-1 through 4-hour curing at a temperature of 80° C.

Example 2-9

The pulverized material of lime-based sludge slag of Example 2-1 was mixed and cured in a manner similar to that of Example 8 (except that curing time at 80° C. was 18 hours). The resultant hardened product was crushed. Subsequently, the crushed material was dried at a temperature of 110° C. for 1 day. Then, 200 g of the crushed material was pulverized in a disk mill for 10 minutes (residue on a 90 $\mu$m sieve: 12 wt. %). To 1700 parts by weight of the thus-pulverized material, was added 34 parts by weight of NaOH and 280.5 wt. % of water. The resultant mixture was mixed in a Hobart mixer. Subsequently, a sample was obtained in a manner similar to that of Example 1 through 4-hour curing at a temperature of 80° C.

Example 2-10

100 parts by weight of the pulverized material of lime-based sludge slag of Example 2-1 were placed in each of a plurality of beakers. Lithium carbonate, sodium carbonate, potassium carbonate, lithium hydroxide, potassium hydroxide, water glass No. 1, water glass No. 3, potassium silicate solution, and sodium aluminate solution were added in an amount of 5 parts by weight each as an alkaline activator into corresponding beakers. Then, 18 parts by weight of water was added into each beaker. The resultant mixtures were mixed. These beakers were left for 4 to 8 hours in a high-temperature high-humidity chamber which was regulated to maintain a humid environment of 80° C. and 98%, thereby obtaining samples.

The mixtures in these beakers all hardened.

Example 2-11

Polymer-based sludge-incinerated ashes were melted in an electric furnace at a temperature of 1400° C. for 1 hour. The resultant melt was poured into water to obtain vitric polymer-based sludge slag (material from Tokyo Metropolitan *Government, Sewage Works Bureau, having the following major chemical composition (wt. %): $SiO_2$ 35.1, $Al_2O_3$ 18.6, $Fe_2O_3$ 9.7, CaO 11.8, MgO 3.1 g, $P_2O_5$ 14.1, S 0.04, $Na_2O$ 1.37, $K_2O$ 2.69, MnO 0.35, and others). This sludge slag was pulverized in 200 g portions in a disk mill for 10 minutes such that about 9 wt. % of residue was left on a 90 $\mu$m sieve. To 150 parts by weight of the thus-pulverized material, were added 4.5 parts by weight of sodium hydroxide as an alkaline activator and 45 parts by weight of water, followed by mixing. The mixed mixture was charged into a mold for forming a sample having a size of 2 cm×2 cm×8 cm while vibration was applied to the mold. The charged mold was placed in a thermostat-hygrostat chamber from Tabai which was set to a temperature of 50° C. Subsequently, the temperature of the chamber was raised from 50° C. to 80° C. over about 20 minutes at a relative humidity of 98%, and subsequently the chamber was maintained at 80° C. for 4 hours (curing time), thereby obtaining a sample.

Example 2-12

To 150 g parts by weight of the pulverized material of polymer-based sludge slag of Example 2-11, were added 37.5 parts by weight of calcium hydroxide as an alkaline activator and 45 parts by weight of water, followed by mixing. The mixed mixture was charged into a mold for forming a sample having a size of 2 cm×2 cm×8 cm while vibration was applied to the mold.

The charged mold was placed in a thermostat-hygrostat chamber from Tabai which was set to a temperature of 50° C. Subsequently, the temperature of the chamber was raised from 50° C. to 80° C. over about 20 minutes at a relative humidity of 98%, and subsequently the chamber was maintained at 80° C. for 4 hours (curing time), thereby obtaining a sample.

Example 2-13

To 150 g parts by weight of the pulverized material of polymer-based sludge slag of Example 2-11, were added 4.5 parts by weight of calcium hydroxide as an alkaline activator, 37.5 parts by weight of calcium hydroxide, and 45 parts by weight of water, followed by mixing.

Since this mixed mixture shows a characteristic of setting in a short period of time, water was further added up to 80 parts by weight, followed by forced mixing. The resultant mixed mixture was charged into a mold for forming a sample having a size of 2 cm×2 cm×8 cm while vibration was applied to the mold.

This formed object was placed in a thermostat-hygrostat chamber from Tabai which was set to a temperature of 20° C. and was left therein at a relative humidity of 98% for 1 day (curing time), thereby obtaining a sample.

Example 2-14

To 150 g parts by weight of the pulverized material of polymer-based sludge slag of Example 2-11, were added 0.38 parts by weight of sodium hydroxide as an alkaline activator, 37.5 parts by weight of calcium hydroxide, and 45 parts by weight of water, followed by mixing. The mixed mixture was charged into a mold for forming a sample having a size of 2 cm×2 cm×8 cm while vibration was applied to the mold.

The charged mold was placed in a thermostat-hygrostat chamber from Tabai which was set to a temperature of 50° C. Subsequently, the temperature of the chamber was raised from 50° C. to 80° C. over about 20 minutes at a relative humidity of 98%, and subsequently the chamber was maintained at 80° C. for 4 hours (curing time), thereby obtaining a sample.

Example 2-15

To 150 g parts by weight of the pulverized material of polymer-based sludge slag of Example 2-11, were added 0.75 parts by weight of sodium hydroxide as an alkaline activator, 37.5 parts by weight of calcium hydroxide, and 45 parts by weight of water, followed by mixing. The mixed mixture was charged into a mold for forming a sample measuring 2 cm×2 cm×8 cm while vibration was applied to the mold. The charged mold was placed in a thermostat-hygrostat chamber from Tabai which was set to a temperature of 50° C. Subsequently, the temperature of the chamber was raised from 50° C. to 80° C. over about 20 minutes at a relative humidity of 98%, and subsequently the chamber was maintained at 80C for 4 hours (curing time), thereby obtaining a sample.

Example 2-16

A mixture of 70 parts by weight of polymer-based sludge-incinerated ashes of Example 2-11 and 30 parts by weight of Ca(OH)$_2$ (first class grade chemical manufactured by Kanto Kagaku Co., Ltd.) was melted in an electric furnace at a temperature of 1450° C. for 1 hour. The resultant melt was poured into water to obtain vitric polymer-based sludge slag. This sludge slag was pulverized in 200 g portions in a disk mill for 10 minutes such that about 8 wt. % of residue was left on a 90 μm sieve. To 150 parts by weight of the thus-pulverized material, were added 4.5 parts by weight of sodium hydroxide as an alkaline activator and 27 parts by weight of water, followed by mixing. The mixed mixture was charged into a mold for forming a sample having a size of 2 cm×2 cm×8 cm while vibration was applied to the mold.

The charged mold was placed in a thermostat-hygrostat chamber from Tabai which was set to a temperature of 50° C. Subsequently, the temperature of the chamber was raised from 50° C. to 80° C. over about 20 minutes at a relative humidity of 98%, and subsequently the chamber was maintained at 80° C. for 4 hours (curing time), thereby obtaining a sample.

Example 2-17

A mixture of 70 parts by weight of polymer-based sludge-incinerated ashes of Example 2-11, 20 parts by weight of Ca(OH)$_2$ (first class grade chemical manufactured by Kanto Kagaku Co., Ltd.), and 10 parts by weight of crushed stone sludge (material from Yukou Kogyo Co., Ltd. having the following major chemical composition (wt. %): SiO$_2$ 54.4, Al$_2$O$_3$ 18.6, Fe$_2$O$_3$ 6.2, CaO 5.6, MgO 2.8, Na$_2$O 3.08, K$_2$O 1.67, and others) was melted in an electric furnace at a temperature of 1400° C. for 1 hour. The resultant melt was poured into water to obtain vitric polymer-based sludge slag. This sludge slag was pulverized in 200 g portions in a disk mill for 10 minutes such that about 8 wt. % of residue was left on a 90 μm sieve. To 150 parts by weight of the thus-pulverized material, were added 4.5 parts by weight of sodium hydroxide as an alkaline activator and 25 parts by weight of water, followed by mixing. The mixed mixture was charged into a mold for forming a sample having a size of 2 cm×2 cm×8 cm while vibration was applied to the mold.

The charged frame was placed in a thermostat-hygrostat chamber from Tabai which was set to a temperature of 50° C. Subsequently, the temperature of the chamber was raised from 50° C. to 80° C. over about 20 minutes at a relative humidity of 98%, and subsequently the chamber was maintained at 80° C. for 4 hours (curing time), thereby obtaining a sample.

Example 2-18

A mixture of 70 parts by weight of polymer-based sludge-incinerated ashes of Example 2-11, 10 parts by weight of Ca(OH)$_2$ (first class grade chemical manufactured by Kanto Kagaku Co., Ltd.), and 20 parts by weight of crushed stone sludge described above in Example 13 was melted in an electric furnace at a temperature of 1400° C. for 1 hour. The resultant melt was poured into water to obtain vitric polymer-based sludge slag. This sludge slag was pulverized in 200 g portions in a disk mill for 10 minutes such that about 8 wt. % of residue was left on a 90 μm sieve. To 150 parts by weight of the thus-pulverized material, were added 4.5 parts by weight of sodium hydroxide as an alkaline stimulator and 25 parts by weight of water, followed by mixing. The mixed mixture was charged into a mold for forming a sample having a size of 2 cm×2 cm×8 cm while vibration was applied to the mold.

The charged mold was placed in a thermostat-hygrostat chamber from Tabai which was set to a temperature of 50°

C. Subsequently, the temperature of the chamber was raised from 50° C. to 80° C. over about 20 minutes at a relative humidity of 98%, and subsequently the chamber was maintained at 80° C. for 4 hours (curing time), thereby obtaining a sample.

Example 2-19

A mixture of 40 parts by weight of polymer-based sludge-incinerated ashes of Example 2-11, 40 parts by weight of Ca(OH)$_2$ (first class grade chemical manufactured by Kanto Kagaku Co., Ltd.), and 20 parts by weight of crushed stone sludge described above in Example 13 was melted in an electric furnace at a temperature of 1500° C. for 1 hour. The resultant melt was poured into water to obtain vitric polymer-based sludge slag. This sludge slag was pulverized in 200 g portions in a disk mill for 10 minutes such that about 11 wt. % of residue was left on a 90 $\mu$m sieve. To 150 parts by weight of the thus-pulverized material, were added 2.3 parts by weight of sodium hydroxide as an alkaline activator and 30 parts by weight of water, followed by mixing. The mixed mixture was charged into a mold for forming a sample having a size of 2 cm×2 cm×8 cm while vibration was applied to the mold.

The charged mold was placed in a thermostat-hygrostat chamber from Tabai which was set to a temperature of 50° C. Subsequently, the temperature of the chamber was raised from 50° C. to 80° C. over about 20 minutes at a relative humidity of 98%, and subsequently the chamber was maintained at 80° C. for 4 hours (curing time), thereby obtaining a sample.

Example 2-20

A mixture of 50 parts by weight of polymer-based sludge-incinerated ashes of Example 2-11 and 50 parts by weight of Ca(OH)$_2$ (first class grade chemical manufactured by Kanto Kagaku Co., Ltd.) was melted in an electric furnace at a temperature of 1550° C. for 1 hour. The resultant melt was poured into water to obtain vitric polymer-based sludge slag. This sludge slag was pulverized in 200 g portions in a disk mill for 10 minutes such that about 11 wt. % of residue was left on a 90 $\mu$m sieve. To 150 parts by weight of the thus-pulverized material, were added 4.5 parts by weight of sodium hydroxide as an alkaline activator and 26 parts by weight of water, followed by mixing. The mixed mixture showed a quick-setting property, but water was further added up to 33 parts by weight, followed by forced mixing. The resultant mixed mixture was charged into a mold for forming a sample having a size of 2 cm×2 cm×8 cm while the mixture was rammed.

This formed object was placed in a thermostat-hygrostat chamber from Tabai which was set to a temperature of 50° C. Subsequently, the temperature of the chamber was raised from 50° C. to 80° C. over about 20 minutes at a relative humidity of 98%, and subsequently the chamber was maintained at 80° C. for 4 hours (curing time), thereby obtaining a sample.

Example 2-21

A mixture of 40 parts by weight of polymer-based sludge-incinerated ashes of Example 2-11, 40 parts by weight of tricalcium phosphate (food additive manufactured by Wako Jyunyaku Kogyo Co., Ltd.), and 20 parts by weight of crushed stone sludge describe above in Example 13 was melted in an electric furnace at a temperature of 1500° C. for 1 hour. The resultant melt was poured into water to obtain vitric polymer-based sludge slag. This sludge slag was pulverized in 200 g portions in a disk mill for 10 minutes such that about 10 wt. % of residue was left on a 90 $\mu$m sieve. To 150 parts by weight of the thus-pulverized material, were added 4.5 parts by weight of sodium hydroxide as an alkaline activator and 24 parts by weight of water, followed by mixing. The mixed mixture was charged into a mold for forming a sample having a size of 2 cm×2 cm×8 cm while vibration was applied to the mold.

The charged mold was placed in a thermostat-hygrostat chamber from Tabai which was set to a temperature of 50° C. Subsequently, the temperature of the chamber was raised from 50° C. to 80° C. over about 20 minutes at a relative humidity of 98%, and subsequently the chamber was maintained at 80° C. for 4 hours (curing time), thereby obtaining a sample.

Example 2-22

Polymer-based sludge-incinerated ashes were melted in an electric furnace at a temperature of 1400° C. for 1 hour. The resultant melt was poured into water to obtain vitric polymer-based sludge slag (material from Saitama Prefectural Sewerage Corp. having the following major chemical composition (wt. %): SiO$_2$ 29.3, Al$_2$O$_3$ 15.8, Fe$_2$O$_3$ 13.0, CaO 9.7, MgO 3.4, P$_2$O$_5$ 22.5, S 0.05 Na$_2$O 1.01, K$_2$O 2.36, MnO 0.19, and others). This sludge slag was pulverized in 200 g portions in a disk mill for 10 minutes such that about 8 wt. % of residue was left on a 90 $\mu$m sieve. To 150 parts by weight of the thus-pulverized material, were added 4.5 parts by weight of sodium hydroxide as an alkaline activator, 37.5 parts by weight of Ca(OH)$_2$, and 49 parts by weight of water, followed by mixing. The mixed mixture was charged into a mold for forming a sample having a size of 2 cm×2 cm×8 cm while vibration was applied to the mold.

The charged mold was placed in a thermostat-hygrostat chamber from Tabai which was set to a temperature of 50° C. Subsequently, the temperature of the chamber was raised from 50° C. to 80° C. over about 20 minutes at a relative humidity of 98%, and subsequently the chamber was maintained at 80° C. for 4 hours (curing time), thereby obtaining a sample.

Comparative Example 2-1

The pulverized material of lime-based sludge slag of Example 2-1 was used to prepare a sample through mixing and curing under conditions similar to those of Example 2-5 (however, an alkaline activator was not used) and through forming in a manner similar to that of Example 1, thereby obtaining a sample of 4-hour curing at 80° C.

This sample was different from a hardened product which was obtained in Example 1.

Comparative Example 2-2

100 parts by weight of sludge-incinerated ashes, which precede lime-based sludge slag of Example 2-1, was placed in each of a plurality of beakers. Various mixtures of NaOH ranging in content from 1 to 5 parts by weight and water ranging in content from 20 to 60 parts by weight were mixed. Through use of these materials, forming was performed in a manner similar to that of Example 2-1, followed by 4-hour curing at 80° C.

The thus-prepared samples did not harden. The chemical composition of incineration ashes is not much different from that of vitrified slag produced from the incineration ashes, but hydraulicity or latent hydraulicity is not present. A conceivable reason for this is that compounds which constitute incineration ashes are in a stable form, and thus reaction does not further advance.

Tables 5 and 6 show measurements of compressive strength for samples obtained in the above-described Examples 2-1 to 2-22.

TABLE 5

| | Composition of slag (wt. %) | | | | | | | | | Formulation (parts by weight) | | | | Curing Conditions & Compressive strength |
|---|---|---|---|---|---|---|---|---|---|---|---|---|---|---|
| | | | | | | | | | | Slag | | | | |
| | $SiO_2$ | CaO | $Al_2O_3$ | $Fe_2O_3$ | MgO | $R_2O$ | $P_2O_5$ | Cl | C/S | powder | agg. | Stimul. | Water | (kgf/cm²) |
| Ex. 2-1 | 32.1 | 34.4 | 14.1 | 4.5 | 2.4 | 1.31 | 8.0 | — | 1.15 | Pulv. 1600 | | NaOH 16 | 264 | 80° C. 2 hours 98<br>80° C. 4 hours 153 |
| Ex. 2-2 | | | | | " | | | | | Pulv. 1600 | | NaOH 46 | 264 | 80° C. 1 hour 404<br>80° C. 2 hours 524<br>80° C. 4 hours 614<br>80° C. 22 hours 787 |
| Ex. 2-3 | | | | | " | | | | | Pulv. 1600 | | NaOH 48 | 224 | 80° C. 1 hour 449<br>80° C. 2 hours 526<br>80° C. 4 hours 622 |
| Ex. 2-4 | | | | | " | | | | | Pulv. 1600 | | NaOH 48 | 264 | 20° C. 1 day 46<br>20° C. 4 days 205 |
| Ex. 2-5 | | | | | " | | | | | Pulv. 1600 | | NaOH 80 | 264 | 20° C. 1 day 126<br>20° C. 3 days 378 |
| Ex. 2-6 | | | | | " | | | | | Pulv. 1600<br>1600<br>1600<br>1600<br>1000 | | $Ca(OH)_2$ 48<br>160<br>240<br>320<br>1000 | 264<br>288<br>335<br>352<br>880 | 80° C. 4 hours 54<br>80° C. 4 hours 110<br>80° C. 4 hours 108<br>80° C. 4 hours 138<br>80° C. 4 hours 106 |
| Ex. 2-7 | | | | | " | | | | | Pulv. 713 | Agg. 1147 | NaOH 21.4 | 168 | 80° C. 4 hours 306 |
| Ex. 2-8 | | | | | " | | | | | Pulv. 1200 | | NaOH 0 | 223 | 80° C. 4 hours 211 |
| Ex. 2-9 | | | | | " | | | | | Pulv. 1700 | | NaOH 34 | 280.5 | 80° C. 4 hours 407 |
| Ex. 2-11 | 35.1 | 11.8 | 18.6 | 9.7 | 3.1 | 4.06 | 14.1 | — | 0.36 | Pulv. 150 | | NaOH 4.5 | 80 | 80° C. 4 hours 21 |
| Ex. 2-12 | | | | | " | | | | | Pulv. 150 | NaOH | $Ca(OH)_2$ 37.5 | 45 | 80° C. 4 hours 78 |
| Ex. 2-13 | | | | | " | | | | | Pulv. 150 | NaOH 4.5 | $Ca(OH)_2$ 37.5 | 45 | 20° C. 1 hour 14 |
| Ex. 2-14 | | | | | " | | | | | Pulv. 150 | NaOH 0.38 | $Ca(OH)_2$ 37.5 | 45 | 80° C. 4 hours 72 |
| Ex. 2-15 | 35.1 | 11.8 | 18.6 | 9.7 | 3.1 | 4.06 | 14.1 | — | 0.36 | Pulv. 150 | NaOH 0.75 | $Ca(OH)_2$ 37.5 | 45 | 80° C. 4 hours 81 |

Note) Agg.:Aggregate, Stimul.:Stimulator, Pulv.: Pulverized product

TABLE 6

| Ex. 2-16 | 26.4 | 32.9 | 15.1 | 7.0 | 2.5 | 2.84 | 10.4 | 0.0 | 1.34 | Pulv. 150 | NaOH 4.5 | | 27 | 80° C. 4 hours 620 |
|---|---|---|---|---|---|---|---|---|---|---|---|---|---|---|
| Ex. 2-17 | 31.2 | 25.7 | 15.3 | 7.8 | 2.9 | 3.41 | 10.5 | 0.0 | 0.88 | Pulv. 150 | NaOH 4.5 | | 24 | 80° C. 4 hours 603 |
| Ex. 2-18 | 36.1 | 18.1 | 17.6 | 8.5 | 3.2 | 3.75 | 10.0 | 0.0 | 0.54 | Pulv. 150 | NaOH 4.5 | | 25 | 80° C. 4 hours 187 |
| Ex. 2-19 | 27.9 | 38.8 | 15.9 | 5.3 | 2.2 | 2.17 | 6.2 | 0.0 | 1.49 | Pulv. 150 | NaOH 1.5 | | 30 | 80° C. 4 hours 90 |
| Ex. 2-20 | 20.4 | 46.7 | 14.6 | 4.7 | 1.8 | 1.72 | 7.9 | 0.0 | 2.45 | Pulv. 150 | NaOH 4.5 | | 33 | 80° C. 4 hours 37 |
| Ex. 2-21 | 24.9 | 28.7 | 11.3 | 5.4 | 2.3 | 2.54 | 22.9 | 0.0 | 1.23 | Pulv. 150 | NaOH 4.5 | | 24 | 80° C. 4 hours 45 |
| Ex. 2-22 | 29.3 | 9.7 | 15.8 | 13.0 | 3.4 | 3.37 | 22.5 | — | 0.35 | Pulv. 150 | NaOH 4.5 | $Ca(OH)_2$ 37.5 | 49 | 80° C. 4 hours 28.5 |

As seen from Tables 5 and 6, a hardening composition of the present invention which contains fused slag produced from a sludge-incinerated substance and an alkaline activator becomes a hardened product having excellent strength merely by mixing with water and mixing and curing the resultant mixture.

Example 3-1

Municipal refuse-incinerated ashes from Asaka City, Saitama Prefecture were melted in an electric furnace at a temperature of 1400° C. for 1 hour. The resultant melt was poured into water to obtain refuse slag (major chemical composition (wt. %): $SiO_2$ 30.1, $Al_2O_3$ 20.5, $Fe_2O_3$ 8.2, CaO 28.0, MgO 4.5, $P_2O_5$ 1.85, $SO_3$ 0.1, $Na_2O$ 1.36, $K_2O$ 0.24, Cl 1.08, and others). This refuse slag was pulverized in 200 g portions in a disk mill for 10 minutes such that fineness becomes about a Blaine value of 2100 cm²/g. To 400 parts by weight of the thus-pulverized material, were added 12 parts by weight of sodium hydroxide as an alkaline activator and 68 parts by weight of water, followed by mixing in a Hobart mixer. The mixed mixture was charged into a mold for forming a sample having a size of 2 cm×2 cm×8 cm while vibration was applied to the mold.

The charged mold was placed in a thermostat-hygrostat chamber (manufactured by Tabai) which was set to a temperature of 20° C. Subsequently, the temperature of the chamber was raised from 20° C. to 80° C. over 3 hours at a relative humidity of 98%, and subsequently the chamber was maintained at 80° C. for 4 hours (and 8 hours) (curing time), thereby obtaining a sample.

Example 3-2

A mixture of 60 parts by weight of municipal refuse-incinerated ashes of Example 3-1, 20 parts by weight of crushed stone sludge (material from Yukou Kogyo Co., Ltd. having the following major chemical composition (wt. %): $SiO_2$ 54.4, $Al_2O_3$ 18.6, $Fe_2O_3$ 6.2, CaO 5.6, MgO 2.8, $Na_2O$ 3.08, $K_2O$ 1.67, and others), and 20 parts by weight of tricalcium phosphate (food additive manufactured by Wako Jyunyaku Kogyo Co., Ltd.) was melted in an electric furnace at a temperature of 1400° C. for 1 hour. The resultant melt was poured into water to obtain vitric refuse slag. This refuse slag was used to prepare a sample through mixing and curing under conditions similar to those of Example 3-1, thereby obtaining a sample of 4-hour curing at 80° C. and a sample of 8-hour curing at 80° C. Table 7 shows the chemical composition of this slag.

Example 3-3

Municipal refuse-incinerated ashes from Yokohama City were melted in an electric furnace at a temperature of 1400° C. for 1 hour. The resultant melt was poured into water to obtain refuse slag (major chemical composition (wt. %): $SiO_2$ 39.2, $Al_2O_3$ 16.0, $Fe_2O_3$ 11.8, CaO 20.0, MgO 3.4, $P_2O_5$ 1.9, $SO_3$ 0.5, $Na_2O$ 2.75, $K_2O$ 1.38, Cl 0.4, and others). This refuse slag was pulverized in 200 g portions in a disk mill for 10 minutes such that fineness becomes about a Blaine value of 2100 $cm^2/g$. To 600 parts by weight of the thus-pulverized material, were added 9 parts by weight of sodium hydroxide as an alkaline activator and 111 parts by weight of water, followed by mixing in a Hobart mixer. The mixed mixture was charged into a mold for forming a sample having a size of 2 cm×2 cm×8 cm while vibration was applied to the mold.

The charged mold was placed in a thermostat-hygrostat chamber (manufactured by Tabai) which was set to a temperature of 20° C. Subsequently, the temperature of the chamber was raised from 20° C. to 80° C. over 3 hours at a relative humidity of 98%, and subsequently the chamber was maintained at 80° C. for 4 hours, 8 hours, and 16 hours (curing time), thereby obtaining respective samples.

Example 3-4

The pulverized slag material of Example 3-3 was used to prepare a sample through mixing and curing under conditions similar to those of Example 3-3 except that the amount of NaOH was 18 parts by weight, thereby obtaining samples of 2-hour, 4-hour, and 22-hour curing at 80° C.

Table 7 shows measurements of compressive strength for samples obtained in the above-described Examples 3-1 to 3-4.

TABLE 7

| | Composition of slag (wt. %) | | | | | | | | | Formulation (parts by weight) | | | | Curing Conditions & Compressive strength |
|---|---|---|---|---|---|---|---|---|---|---|---|---|---|---|
| | $SiO_2$ | CaO | $Al_2O_3$ | $Fe_2O_3$ | MgO | $R_2O$ | $P_2O_5$ | Cl | C/S | Slag powder | agg. | Stimul. | Water | (kgf/cm²) |
| Ex. 3-1 | 30.1 | 28.0 | 20.5 | 8.2 | 4.5 | 1.60 | 1.85 | 1.1 | 1.00 | Pulv. 400 | | NaOH 12 | 68 | 80° C. 4 hours 511<br>80° C. 8 hours 612 |
| Ex. 3-2 | 27.6 | 28.9 | 16.3 | 6.2 | 3.5 | 2.57 | 10.5 | 1.7 | 1.12 | Pulv. 400 | | NaOH 12 | 68 | 80° C. 1 hour 404<br>80° C. 2 hours 524<br>4 hours 614<br>80 ° C. 22 hours 787 |
| Ex. 3-3 | 39.2 | 20.0 | 16.0 | 11.8 | 3.4 | 4.15 | 1.9 | 0.4 | 0.55 | Pulv. 600 | | NaOH 9 | 111 | 80° C. 4 hours 322<br>80° C. 8 hours 459<br>16 hours 519 |
| Ex. 3-4 | | | | | " | | | | | Pulv. 600 | | NaOH 18 | 111 | 80° C. 4 hours 841<br>80° C. 8 hours 997<br>16 hours 1128 |

As seen from Table 8, a hardening composition of the present invention which contains fused slag produced from a refuse-incinerated substance and an alkaline activator becomes a hardened product having excellent strength merely by mixing with water and curing the resultant mixture.

Example 4-1

Municipal refuse-incinerated ashes from Yokohama City contained in an alumina container were melted in an electric furnace at a temperature of 1400° C. for 1 hour. The resultant melt was poured into water to obtain refuse slag (major chemical composition (wt. %): $SiO_2$ 39.1, $Al_2O_3$ 15.6, $Fe_2O_3$ 12.3, CaO 20.3, MgO 3.3, $SO_3$ 0.6, $Na_2O$ 2.70, $K_2O$ 1.41, $TiO_2$ 1.74, $P_2O_5$ 1.70, and others). This refuse slag was pulverized in 200 g portions in a disk mill for 10 minutes such that about 17.6 wt. % of residue was left on a 90 μm sieve and about 31 wt. % of residue was left on a 63 μm sieve. To 600 parts by weight of the thus-pulverized material, were added 180 parts by weight of a commercially available alkali silicate solution (water glass No. 1) and 30 parts by weight of water, followed by mixing in a Hobart mixer. The mixed mixture was charged into a mold for forming a sample having a size of 2 cm×2 cm×8 cm while vibration was applied to the mold.

The charged mold was placed in a thermostat-hygrostat chamber (manufactured by Tabai) which was set to a temperature of 20° C. Subsequently, the temperature of the chamber was raised from 20° C. to 80° C. over 3 hours at a relative humidity of 98%, and subsequently the chamber was maintained at 80° C. for 4 hours (8 hours and 16 hours) (curing time), thereby obtaining a sample.

Example 4-2

The pulverized material of refuse slag of Example 4-1 was used to prepare a sample through mixing and curing under conditions similar to those of Example 4–1 except that 180 parts by weight of water glass No. 3 as alkali silicate was added to 600 parts by weight of the pulverized material, thereby obtaining samples of 4-hour, 8-hour, and 16-hour curing at 80° C.

Example 4-3

The pulverized material of refuse slag of Example 4-1 and water glass No. 1 as alkali silicate were used to prepare a sample through mixing and forming under conditions similar to those of Example 4-1. The formed material was cured in a humid environment at a temperature of 20° C. for 3 days (and 7 days).

Example 4-4

200 parts by weight of the pulverized material of refuse slag of Example 4-1, 200 parts by weight of aggregate having a grain size of 0.5 to 2.38 mm prepared by coarsely pulverizing the refuse slag, 120 parts by weight of water glass No. 1, and 10 parts by weight of water were mixed and subsequently processed in a manner similar to that of Example 4-1, thereby obtaining a sample.

Example 4-5

200 parts by weight of the pulverized material of refuse slag of Example 4-1, 200 parts by weight of aggregate having a grain size of 0.5 to 2.38 mm prepared by coarsely pulverizing the refuse slag, and 120 parts by weight of water glass No. 3 were mixed and subsequently processed in a manner similar to that of Example 4-1, thereby obtaining a sample.

Example 4-6

200 parts by weight of the pulverized material of refuse slag of Example 4-1, 200 parts by weight of aggregate having a grain size of 0.5 to 2.38 mm prepared by coarsely pulverizing the refuse slag, and 120 parts by weight of soda aluminate (product #2019 manufactured by Asada Kagaku Kogyo, Co., Ltd.) were mixed and subsequently processed in a manner similar to that of Example 4-1, thereby obtaining a sample.

Example 4-7

200 parts by weight of the pulverized material of refuse slag of Example 4-1, 200 parts by weight of aggregate having a grain size of 0.5 to 2.38 mm prepared by coarsely pulverizing the refuse slag, and 120 parts by weight of soda aluminate (product #1219 manufactured by Asada Kagaku Kogyo, Co., Ltd.) were mixed and subsequently processed in a manner similar to that of Example 4-1, thereby obtaining a sample.

Example 4-8

A mixture of 90 parts by weight of municipal refuse-incinerated ashes from Yokohama City and 10 parts by weight of calcium hydroxide (special grade chemical manufactured by Kanto Kagaku Co., Ltd.) contained in an alumina container was melted in an electric furnace at a temperature of 1400° C. for 1 hour. The resultant melt was poured into water to obtain refuse slag (major chemical composition (wt. %): $SiO_2$ 35.1, $Al_2O_3$ 14.4, $Fe_2O_3$ 11.9, CaO 27.2, MgO 2.9, $SO_3$ 0.7, $Na_2O$ 2.29, $K_2O$ 1.10, $TiO_2$ 1.5, $P_2O_5$ 1.5, and others). This refuse slag was pulverized in 200 g portions in a disk mill for 10 minutes such that about 14.4 wt. % of residue was left on a 90 $\mu$m sieve and about 27.9 wt. % of residue was left on a 63 $\mu$m sieve. To 600 parts by weight of the thus-pulverized material, were added 180 parts by weight of water glass No. 1 and 30 parts by weight of water, followed by mixing in a Hobart mixer. The resulting mixed mixture was processed in a manner similar to that of Example 4-1, thereby obtaining a sample.

Example 4-9

The pulverized material of refuse slag of Example 4-8 a and water glass No. 1 as alkali silicate were used to prepare a sample through mixing and forming under conditions similar to those of Example 4-1. The formed material was cured in a humid environment at a temperature of 20° C. for 3 days (7 days and 28 days).

Example 4-10

The pulverized material of refuse slag of Example 4-8 was used to prepare a sample through mixing and curing under conditions similar to those of Example 4-1 except that 180 parts by weight of water glass No. 3 as alkali silicate was added to 600 parts by weight of the pulverized material, thereby obtaining samples of 4-hour, 8-hour, and 16-hour curing at 80° C.

Example 4-11

A mixture of 80 parts by weight of municipal refuse-incinerated ashes from Yokohama City and 20 parts by weight of calcium hydroxide (special grade chemical manufactured by Kanto Kagaku Co., Ltd.) contained in an alumina container was melted in an electric furnace at a temperature of 1400° C. for 1 hour. The resultant melt was poured into water to obtain refuse slag (major chemical composition (wt. %): $SiO_2$ 31.5, $Al_2O_3$ 13.3, $Fe_2O_3$ 10.3, CaO 34.4, MgO 2.7, $SO_3$ 0.9, $Na_2O$ 2.08, $K_2O$ 0.89, $TiO_2$ 1.4, $P_2O_5$ 1.4, and others). This refuse slag was pulverized in 200 g portions in a disk mill for 10 minutes such that about 16.1 wt. % of residue was left on a 90 $\mu$m sieve and about 26.1 wt. % of residue was left on a 63 $\mu$m sieve. To 600 parts by weight of the thus-pulverized material, were added 180 parts by weight of water glass No. 1 and 30 parts by weight of water, followed by mixing in a Hobart mixer. The resulting mixed mixture was processed in a manner similar to that of Example 4-1, thereby obtaining a sample.

Example 4-12

The pulverized material of refuse slag of Example 4-11 and water glass No. 1 as alkali silicate were used to prepare a sample through mixing and forming under conditions similar to those of Example 4-1. The formed material was cured in a humid environment at a temperature of 20° C. for 3 days (7 days and 28 days).

Example 4-13

The pulverized material of refuse slag of Example 4-11 was used to prepare a sample through mixing and curing under conditions similar to those of Example 4-1 except that 180 parts by weight of water glass No. 3 as alkali silicate was added to 600 parts by weight of the pulverized material, thereby obtaining samples of 4-hour, 8-hour, and 16-hour curing at 80° C.

Example 4-14

A mixture of 70 parts by weight of municipal refuse-incinerated ashes from Yokohama City and 30 parts by weight of calcium hydroxide (special grade chemical manufactured by Kanto Kagaku Co., Ltd.) contained in an alumina container was melted in an electric furnace at a temperature of 1500° C. for 1 hour. The resultant melt was poured into water to obtain refuse slag (major chemical composition (wt. %): $SiO_2$ 27.4, $Al_2O_3$ 18.1, $Fe_2O_3$ 8.1, CaO 39.0, MgO 2.1, $SO_3$ 0.1, $Na_2O$ 1.63, $K_2O$ 0.51, $TiO_2$ 0.9, $P_2O_5$ 1.2, and others). This refuse slag was pulverized in 200 g portions in a disk mill for 10 minutes such that about 17.8 wt. % of residue was left on a 90 μm sieve and about 31.3 wt. % of residue was left on a 63 μm sieve. To 600 parts by weight of the thus-pulverized material, were added 180 parts by weight of water glass No. 3, followed by mixing in a Hobart mixer. The resulting mixed mixture was processed in a manner similar to that of Example 4-1, thereby obtaining a sample. Example 4-15

A mixture of 60 parts by weight of municipal refuse-incinerated ashes from Yokohama City and 40 parts by weight of calcium hydroxide (special grade chemical manufactured by Kanto Kagaku Co., Ltd.) contained in an alumina container was melted in an electric furnace at a temperature of 1550° C. for 1 hour. The resultant melt was poured into water to obtain refuse slag (major chemical composition (wt. %): $SiO_2$ 21.9, $Al_2O_3$ 24.0, $Fe_2O_3$ 6.7, CaO 40.7, MgO 1.8, $SO_3$ 0.4, $Na_2O$ 1.41, $K_2O$ 0.42, $TiO_2$ 0.9, $P_2O_5$ 0.9, and others). This refuse slag was pulverized in 200 g portions in a disk mill for 10 minutes such that about 19 wt. % of residue was left on a 90 μm sieve and about 31.1 wt. % of residue was left on a 63 μm sieve. To 600 parts by weight of the thus-pulverized material, were added 180 parts by weight of water glass No. 1 and 30 parts by weight of water, followed by mixing in a Hobart mixer. However, the mixture set during mixing, indicating the quick-hardening property. Thus, no sample for strength test was prepared from this mixture. An X-ray analysis revealed that this refuse slag was not completely vitrified.

Example 4-16

A mixture of 40 parts by weight of municipal refuse-incinerated ashes from Yokohama City and 60 parts by weight of crushed stone sludge (waste material supplied by Yukou Kogyo Co., Ltd.) contained in an alumina container was melted in an electric furnace at a temperature of 1400° C. for 1 hour. The resultant melt was poured into water to obtain refuse slag (major chemical composition (wt. %): $SiO_2$ 54.3, $Al_2O_3$ 17.9, $Fe_2O_3$ 6.8, CaO 7.7, MgO 3.5, $SO_3$ 0.3, $Na_2O$ 3.55, $K_2O$ 1.18, $TiO_2$ 1.0, $P_2O_5$ 0.4, Cl 0.0, and others). This refuse slag was pulverized in 200 g portions in a disk mill for 10 minutes such that about 11 wt. % of residue was left on a 90 μm sieve and about 25.5 wt. % of residue was left on a 63 μm sieve. To 600 parts by weight of the thus-pulverized material, were added 180 parts by weight of water glass No. 1 and 30 parts by weight of water, followed by mixing in a Hobart mixer. The resulting mixed mixture was processed in a manner similar to that of Example 4-1, thereby obtaining a sample.

Example 4-17

The pulverized material of refuse slag of Example 4-16 was used to prepare a sample through mixing and curing under conditions similar to those of Example 4-1 except that 180 parts by weight of water glass No. 3 as alkali silicate was added to 600 parts by weight of the pulverized material, thereby obtaining samples of 4-hour, 8-hour, and 16-hour curing at 80° C.

Example 4-18

The pulverized material of refuse slag of Example 4-16 was used to prepare a sample through mixing and curing under conditions similar to those of Example 4-1 except that 180 parts by weight of a soda aluminate solution (product #2019 manufactured by Asada Kagaku, Co., Ltd.) as alkali aluminate was added to 600 parts by weight of the pulverized material, thereby obtaining samples of 4-hour, 8-hour, and 16-hour curing at 80° C.

Example 4-19

Municipal refuse-incinerated ashes from Kumagaya City contained in an alumina container were melted in an electric furnace at a temperature of 1400° C. for 1 hour. The resultant melt was poured into water to obtain refuse slag (major chemical composition (wt. %): $SiO_2$ 36.6, $Al_2O_3$ 17.7, $Fe_2O_3$ 5.9, CaO 23.4, MgO 3.8, $SO_3$ 0.2, $Na_2O$ 3.42, $K_2O$ 1.82, $TiO_2$ 1.9, $P_2O_5$ 3.5, MnO 0.1 and others). This refuse slag was pulverized in 200 g portions in a disk mill for 10 minutes such that about 18.1 wt. % of residue was left on a 90 μm sieve and about 31 wt. % of residue was left on a 63 μm sieve. To 200 parts by weight of the thus-pulverized material and 200 parts by weight of aggregate having a grain size of 0.5 to 2.38 mm prepared by coarsely pulverizing the refuse slag, were added 20 parts by weight of a commercially available alkali silicate solution (water glass No. 1) and 36 parts by weight of water, followed by mixing in a Hobart mixer. The mixed mixture was charged into a mold for forming a sample having a size of 2 cm×2 cm×8 cm while vibration was applied to the mold.

The charged mold was placed in a thermostat-hygrostat chamber (manufactured by Tabai) which was set to a temperature of 20° C. Subsequently, the temperature of the chamber was raised from 20° C. to 80° C. over 3 hours at a relative humidity of 98%, and subsequently the chamber was maintained at 80° C. for 4 hours (8 hours and 16 hours) (curing time), thereby obtaining a sample.

Example 4-20

200 parts by weight of the pulverized material of refuse slag of Example 4-19, 200 parts by weight of aggregate having a grain size of 0.5 to 2.38 mm prepared by coarsely pulverizing the refuse slag, 40 parts by weight of water glass No. 1, and 32 parts by weight of water were mixed and subsequently processed in a manner similar to that of Example 4-1, thereby obtaining a sample.

Example 4-21

200 parts by weight of the pulverized material of refuse slag of Example 4-19, 200 parts by weight of aggregate having a grain size of 0.5 to 2.38 mm prepared by coarsely pulverizing the refuse slag, 80 parts by weight of water glass No. 1, and 16 parts by weight of water were mixed and subsequently processed in a manner similar to that of Example 4-1, thereby obtaining a sample.

Example 4-22

200 parts by weight of the pulverized material of refuse slag of Example 4-19, 200 parts by weight of aggregate having a grain size of 0.5 to 2.38 mm prepared by coarsely pulverizing the refuse slag, 120 parts by weight of water glass No. 1, and 8 parts by weight of water were mixed and subsequently processed in a manner similar to that of Example 4-1, thereby obtaining a sample.

Example 4-23

200 parts by weight of the pulverized material of refuse slag of Example 4-19, 200 parts by weight of aggregate having a grain size of 0.5 to 2.38 mm prepared by coarsely pulverizing the refuse slag, and 200 parts by weight of water glass No. 1 were mixed and subsequently processed in a manner similar to that of Example 4-1, thereby obtaining a sample.

Example 4-24

200 parts by weight of the pulverized material of refuse slag of Example 4-19, 200 parts by weight of aggregate having a grain size of 0.5 to 2.38 mm prepared by coarsely pulverizing the refuse slag, and 400 parts by weight of water glass No. 1 were mixed and subsequently processed in a manner similar to that of Example 4-1, thereby obtaining a sample.

Example 4-25

200 parts by weight of the pulverized material of refuse slag of Example 4-19, 200 parts by weight of aggregate having a grain size of 0.5 to 2.38 mm prepared by coarsely pulverizing the refuse slag, and 80 parts by weight of water glass No. 3 were mixed and subsequently processed in a manner similar to that of Example 4-1, thereby obtaining a sample.

Example 4-26

200 parts by weight of the pulverized material of refuse slag of Example 4-19, 200 parts by weight of aggregate having a grain size of 0.5 to 2.38 mm prepared by coarsely pulverizing the refuse slag, and 80 parts by weight of a soda aluminate solution (product #2019 manufactured by Asada Kagaku, Co., Ltd.) as alkali aluminate were mixed and subsequently processed in a manner similar to that of Example 4-1, thereby obtaining a sample.

Example 4-27

Municipal refuse-incinerated ashes (principal ashes) from Kumagaya City contained in an alumina container were melted in an electric furnace at a temperature of 1400° C. for 1 hour. The resultant melt was poured into water to obtain refuse slag (major chemical composition (wt. %): $SiO_2$ 30.6, $Al_2O_3$ 19.1, $Fe_2O_3$ 2.0, CaO 30.9, MgO 5.6, $SO_3$ 2.1, $Na_2O$ 1.50, $K_2O$ 0.51, $TiO_2$ 3.1, $P_2O_5$ 2.2, MnO 0.1 and others). This refuse slag was pulverized in 200 g portions in a disk mill for 10 minutes such that about 15.1 wt. % of residue was left on a 90 μm sieve and about 25.5 wt. % of residue was left on a 63 μm sieve. To 600 parts by weight of the thus-pulverized material, were added 180 parts by weight of a commercially available alkali silicate solution (water glass No. 1) and 30 parts by weight of water, followed by mixing in a Hobart mixer. The mixed mixture was charged into a mold for forming a sample having a size of 2 cm×2 cm×8 cm while vibration was applied to the mold.

The charged mold was placed in a thermostat-hygrostat chamber (manufactured by Tabai) which was set to a temperature of 20° C. Subsequently, the temperature of the chamber was raised from 20° C. to 80° C. over 3 hours at a relative humidity of 98%, and subsequently the chamber was maintained at 80° C. for 4 hours (8 hours and 16 hours) (curing time), thereby obtaining a sample.

Example 4-28

The pulverized material of refuse slag of Example 4-27 was used to prepare a sample through mixing and curing under conditions similar to those of Example 4-1 except that 180 parts by weight of water glass No. 3 as alkali silicate was added to 600 parts by weight of the pulverized material, thereby obtaining samples of 4-hour, 8-hour, and 16-hour curing at 80° C.

Example 4-29

The pulverized material of refuse slag of Example 4-27 was used to prepare a sample through mixing and curing under conditions similar to those of Example 4-1 except that 180 parts by weight of a soda aluminate solution (product #2019 manufactured by Asada Kagaku, Co., Ltd.) as alkali aluminate was added to 600 parts by weight of the pulverized material, thereby obtaining samples of 4-hour, 8-hour, and 16-hour curing at 80° C.

Example 4-30

A mixture of 100 parts by weight of municipal refuse-incinerated ashes (principal ashes) from Kumagaya City and 50 parts by weight of municipal refuse-incinerated ashes (fly ashes) from Kumagaya City contained in an alumina container was melted in an electric furnace at a temperature of 1400° C. for 1 hour. The resultant melt was poured into water to obtain refuse slag (major chemical composition (wt. %): $SiO_2$ 34.1, $Al_2O_3$ 17.5, $Fe_2O_3$ 5.0, CaO 26.3, MgO 4.1, $SO_3$ 1.4, $Na_2O$ 2.71, $K_2O$ 1.20, $TiO_2$ 2.2, $P_2O_5$ 3.1, MnO 0.1 and others). This refuse slag was pulverized in 200 g portions in a disk mill for 10 minutes such that about 15.6 wt. % of residue was left on a 90 μm sieve and about 26.3 wt. % of residue was left on a 63 μm sieve. To 200 parts by weight of the thus-pulverized material and 200 parts by weight of aggregate having a grain size of 0.5 to 2.38 mm prepared by coarsely pulverizing the refuse slag, were added 90 parts by weight of a commercially available alkali silicate solution (water glass No. 1) and 10 parts by weight of water. The resulting mixture was processed through mixing and curing under conditions similar to those of Example 4-1, thereby obtaining samples of 4-hour, 8-hour, and 16-hour curing at 80° C.

Example 4-31

The pulverized material of refuse slag of Example 4-30 was used to prepare a sample through mixing and curing under conditions similar to those of Example 4-1 except that 90 parts by weight of a commercially available alkali silicate solution (water glass No. 1), 10 parts by weight of water, and 90 parts by weight of water glass No. 3 as alkali silicate were added to 200 parts by weight of the pulverized material and 200 parts by weight of aggregate having a grain size of 0.5 to 2.38 mm prepared by coarsely pulverizing the refuse slag, thereby obtaining samples of 4-hour, 8-hour, and 16-hour curing at 80° C.

Example 4-32

The pulverized material of refuse slag of Example 4-30 was used to prepare a sample through mixing and curing under conditions similar to those of Example 4-1 except that 90 parts by weight of soda aluminate (product #2019 manufactured by Asada Kagaku, Co., Ltd.) as alkali aluminate was added to 200 parts by weight of the pulverized material and 200 parts by weight of aggregate having a grain size of 0.5 to 2.38 mm prepared by coarsely pulverizing the refuse slag, thereby obtaining samples of 4-hour, 8-hour, and 16-hour curing at 80° C.

Example 4-33

Fines were removed from municipal refuse-incinerated ashes (principal ashes) from Kumagaya City using a 2.38 mm sieve. The residual material, which is conceivably rich in glass refuse and metallic refuse such as aluminum cans, contained in an alumina container was melted in an electric furnace at a temperature of 1400° C. for 1 hour. The resultant melt was poured into water to obtain refuse slag (major chemical composition (wt. %): $SiO_2$ 54.6, $Al_2O_3$ 9.7, $Fe_2O_3$ 3.1, CaO 17.6, MgO 2.0, $SO_3$ 0.1, $Na_2O$ 7.49, $K_2O$ 1.38, $TiO_2$ 1.1, $P_2O_5$ 1.7, MnO 0.1, Cl 0.1 and others). This refuse slag was pulverized in 200 g portions in a disk mill for 10 minutes such that about 26 wt. % of residue was left on a 90 $\mu$m sieve and about 35.6 wt. % of residue was left on a 63 $\mu$m sieve. To 600 parts by weight of the thus-pulverized material, were added 180 parts by weight of water glass No. 1 and 30 parts by weight of water, followed by mixing in a Hobart mixer. The mixed mixture was subsequently processed in a manner similar to that of Example 4-1, thereby obtaining samples.

The thus-obtained samples all swelled after curing. Therefore, their surface portions were cut off using a diamond cutter to obtain samples, each having a size of 2 cm×2 cm×8 cm, for strength measurement use.

This swell during curing is conceivably caused in the following mechanism. Since a metal reactive to alkali, particularly aluminum remains in the form of metal in refuse slag and sludge slag, such a metal reacts with alkaline water glass to produce a hydrogen gas, whose expansion pressure causes the samples to swell. This indicates that a lightweight hardened product similar to ALC (autoclaved lightweight concrete) can be readily obtained with no requirement of high-temperature high-pressure curing in an autoclave.

Example 4-34

The pulverized material of refuse slag of Example 4-33 was used to prepare a sample through mixing and curing under conditions similar to those of Example 4-1 except that 180 parts by weight of water glass No. 3 as alkali silicate was added to 600 parts by weight of the pulverized material, thereby obtaining samples of 4-hour, 8-hour, and 16-hour curing at 80° C.

These samples all swelled after curing. Therefore, their surface portions were cut off using a diamond cutter to obtain samples, each having a size of 2 cm×2 cm×8 cm, for strength measurement use.

Example 4-35

The pulverized material of refuse slag of Example 4-33 was used to prepare a sample through mixing and curing under conditions similar to those of Example 4-1 except that 180 parts by weight of a soda aluminate solution (product #2019 manufactured by Asada Kagaku, Co., Ltd.) as alkali aluminate was added to 600 parts by weight of the pulverized material, thereby obtaining samples of 4-hour, 8-hour, and 16-hour curing at 80° C.

These samples all swelled after curing. Therefore, their surface portions were cut off using a diamond cutter to obtain samples, each having a size of 2 cm×2 cm×8 cm, for strength measurement use.

Example 4-36

A mixture of 10 parts by weight of municipal refuse-incinerated ashes (principal ashes) from Kumagaya City and 90 parts by weight of crushed stone sludge (waste material supplied by Yukou Kogyo Co., Ltd.) contained in an alumina container was melted in an electric furnace at a temperature of 1400° C. for 1 hour. The resultant melt was poured into water to obtain refuse slag (major chemical composition (wt. %): $SiO_2$ 54.6, $Al_2O_3$ 18.1, $Fe_2O_3$ 6.7, CaO 7.7, MgO 3.5, $SO_3$ 0.3, $Na_2O$ 3.55, $K_2O$ 1.18, $TiO_2$ 1.0, $P_2O_5$ 0.4, MnO 0.1, Cl 0.0, and others). This refuse slag was pulverized in 200 g portions in a disk mill for 10 minutes such that about 28 wt. % of residue was left on a 90 $\mu$m sieve and about 28 wt. % of residue was left on a 63 $\mu$m sieve. To 600 parts by weight of the thus-pulverized material, were added 180 parts by weight of water glass No. 1 and 30 parts by weight of water, followed by mixing in a Hobart mixer. The resulting mixed mixture was processed in a manner similar to that of Example 4-1, thereby obtaining a sample. Example 4-37

The pulverized material of refuse slag of Example 4-36 was used to prepare a sample through mixing and curing under conditions similar to those of Example 4-1 except that 180 parts by weight of water glass No. 3 as alkali silicate was added to 600 parts by weight of the pulverized material, thereby obtaining samples of 4-hour, 8-hour, and 16-hour curing at 80° C.

Example 4-38

The pulverized material of refuse slag of Example 4-36 was used to prepare a sample through mixing and curing under conditions similar to those of Example 4-1 except that 180 parts by weight of a soda aluminate solution (product #2019 manufactured by Asada Kagaku, Co., Ltd.) as alkali aluminate was added to 600 parts by weight of the pulverized material, thereby obtaining samples of 4-hour, 8-hour, and 16-hour curing at 80° C.

Example 4-39

Refuse slag (major chemical composition (wt. %): $SiO_2$ 36.6, $Al_2O_3$ 18.8, $Fe_2O_3$ 8.2, CaO 21.5, MgO 3.7, $SO_3$ 0.3, $Na_2O$ 3.24, $K_2O$ 1.33, $TiO_2$ 2.2, $P_2O_5$ 2.5, MnO 0.2, Cl 0.3 and others) obtained from municipal refuse from Eastern Association of Public Cleaning, Yoshikawa-cho, Saitama, was pulverized in 200 g portions in a disk mill for 10 minutes such that about 12.8 wt. % of residue was left on a 90 $\mu$m sieve and about 26 wt. % of residue was left on a 63 $\mu$m sieve. To 1800 parts by weight of the thus-pulverized material, were added 540 parts by weight of a commercially available alkali silicate solution (water glass No. 1) and 90 parts by weight of water, followed by mixing in a Hobart mixer. The mixed mixture was charged into a mold for forming a sample having a size of 4 cm×4 cm×16 cm while vibration was applied to the mold.

The charged mold was placed in a thermostat-hygrostat chamber (manufactured by Tabai) which was set to a temperature of 20° C. Subsequently, the temperature of the chamber was raised from 20° C. to 80° C. over 3 hours at a relative humidity of 98%, and subsequently the chamber was maintained at 80° C. for 4 hours (8 hours and 16 hours) (curing time), thereby obtaining a sample.

These samples all swelled after curing. Therefore, their surface portions were cut off using a diamond cutter to obtain samples for strength measurement use.

Example 4-40

The pulverized material of refuse slag of Example 4-39 was used to prepare a sample through mixing and curing under conditions similar to those of Example 4-37 except that 540 parts by weight of water glass No. 3 as alkali silicate was added to 1800 parts by weight of the pulverized material, thereby obtaining samples of 4-hour, 8-hour, and 16-hour curing at 80° C.

As in Example 4-33, these samples all swelled after curing. Therefore, their surface portions were cut off using a diamond cutter to obtain samples, each having a size of 4 cm×4 cm×16 cm, for strength measurement use.

Example 4-41

The pulverized material of refuse slag of Example 4-39 was used to prepare a sample through mixing and curing under conditions similar to those of Example 4-37 except that 540 parts by weight of a soda aluminate solution (product #2019 manufactured by Asada Kagaku, Co., Ltd.) as alkali aluminate was added to 600 parts by weight of the pulverized material, thereby obtaining samples of 4-hour, 8-hour, and 16-hour curing at 80° C.

As in Example 4-33, these samples all swelled after curing. Therefore, their surface portions were cut off using a diamond cutter to obtain samples, each having a size of 4 cm×4 cm×16 cm, for strength measurement use.

As described above, swelling occurred during curing for samples of Examples 4-33 to 4-35 and Examples 4-39 to 4-41. This swell during curing is conceivably caused in the following mechanism. Since a metal reactive to alkali, particularly aluminum remains in the form of metal in refuse slag, such a metal reacts with alkaline water glass or soda aluminate to produce a hydrogen gas, whose expansion pressure causes the samples to swell. This indicates that a light-weight hardened product similar to ALC (autoclaved light-weight concrete) can be readily obtained with no requirement of high-temperature high-pressure curing in an autoclave. Further, an example is not given herein, but when refuse slag is obtained from classified refuse which does not contain metallic aluminum, it is confirmed that a similar ALC-like hardened body can be obtained from such refuse slag or sludge slag through addition of metallic aluminum powder thereto. This can be one of features of the present invention.

Example 4-42

A mixture of 160 parts by weight of municipal refuse-incinerated ashes from Yokohama City and 5 parts by weight of sodium fluoride (special grade chemical manufactured by Kanto Kagaku Co., Ltd.) contained in an alumina container was melted in an electric furnace at a temperature of 1300° C. for 1 hour. The resultant melt was poured into water to obtain refuse slag (major chemical composition (wt. %): $SiO_2$ 37.1, $Al_2O_3$ 14.9, $Fe_2O_3$ 11.6, CaO 19.3, MgO 3.1, $SO_3$ 0.6, $Na_2O$ 6.04, $K_2O$ 1.30, $TiO_2$ 1.5, $P_2O_5$ 1.5, F 2.1 and others). This refuse slag was pulverized in 200 g portions in a disk mill for 10 minutes such that about 23.5 wt. % of residue was left on a 90 $\mu$m sieve and about 35.6 wt. % of residue was left on a 63 $\mu$m sieve. To 600 parts by weight of the thus-pulverized material, were added 180 parts by weight of water glass No. 3, followed by mixing in a Hobart mixer. The mixed mixture was subsequently processed in a manner similar to that of Example 4-1, thereby obtaining a sample.

Example 4-43

A mixture of 80 parts by weight of municipal refuse-incinerated ashes from Yokohama City and 20 parts by weight of calcium hydrogenphosphate 2-hydrate (special grade chemical manufactured by Kanto Kagaku Co., Ltd.) contained in an alumina container was melted in an electric furnace at a temperature of 1300° C. for 1 hour. The resultant melt was poured into water to obtain refuse slag (major chemical composition (wt. %): $SiO_2$ 31.0, $Al_2O_3$ 12.6, $Fe_2O_3$ 9.7, CaO 26.5, MgO 2.6, $SO_3$ 0.5, $Na_2O$ 2.11, $K_2O$ 1.12, $TiO_2$ 1.3, $P_2O_5$ 9.6, and others). This refuse slag was pulverized in 200 g portions in a disk mill for 10 minutes such that about 13.6 wt. % of residue was left on a 90 $\mu$m sieve and about 26.3 wt. % of residue was left on a 63 $\mu$m sieve. To 600 parts by weight of the thus-pulverized material, were added 180 parts by weight of water glass No. 1 and 30 parts by weight of water, followed by mixing in a Hobart mixer. The mixed mixture was subsequently processed in a manner similar to that of Example 4-1, thereby obtaining a sample.

Example 4-44

Lime-based sludge slag (material from Osaka Municipal Sewerage Corp. having the following major chemical composition (wt. %): $SiO_2$ 33.4, $Al_2O_3$ 14.2, $Fe_2O_3$ 5.0, CaO 33.9, MgO 2.4, $P_2O_5$ 7.0, S 1.1, $Na_2O$ 0.75, $K_2O$ 0.68, and others) was pulverized in 200 g portions in a disk mill for 10 minutes such that about 10 wt. % of residue was left on a 90 $\mu$m sieve and about 26 wt. % of residue was left on a 63 $\mu$m sieve. To 900 parts by weight of the thus-pulverized material, were added 270 parts by weight of water glass No. 1 and 45 parts by weight of water. The resultant mixture was mixed in a Hobart mixer. The mixed mixture was charged into a mold for forming a sample having a size of 2 cm×2 cm×8 cm to be used in a strength test of normal portland cement mortar, while vibration was applied to the mold.

The charged mold was placed in a thermostat-hygrostat chamber (manufactured by Tabai) which was set to a temperature of 20° C. Subsequently, the temperature of the chamber was raised from 20° C. to 80° C. over about 3 hours at a relative humidity of 98%, and subsequently the chamber was maintained at 80° C. for 4 hours (8 hours and 16 hours) (curing time), thereby obtaining a sample.

Some 8-hour-cured samples were immersed in 10% hydrochloric acid and sulfuric acid solutions for 7 and 14 days, respectively, to thereby prepare acid-resistance-tested samples.

Example 4-45

The pulverized material of lime-based sludge slag of Example 4-44 was used to prepare a sample through mixing and curing under conditions similar to those of Example 4-1 except that 270 parts by weight of water glass No. 3 was added to 900 parts by weight of the pulverized material, thereby obtaining samples of 4-hour, 8-hour, and 16-hour curing at 80° C. Some 8-hour-cured samples were immersed in 10% hydrochloric acid and sulfuric acid solutions for 7 and 14 days, respectively, to thereby prepare acid-resistance-tested samples.

Example 4-46

The pulverized material of lime-based sludge slag of Example 4-44 was used to prepare a sample through mixing and curing under conditions similar to those of Example 4-1 except that 20 parts by weight of water glass No. 1 and 32 parts by weight of water were added to 150 parts by weight of the pulverized material and 200 parts by weight of aggregate having a grain size of 0.5 to 2.38 mm prepared by coarsely pulverizing the sludge slag, thereby obtaining samples of 4-hour, 8-hour, and 16-hour curing at 80° C.

Example 4-47

The pulverized material of lime-based sludge slag of Example 4-44 was used to prepare a sample through mixing and curing under conditions similar to those of Example 4-1 except that 40 parts by weight of water glass No. 1 and 24 parts by weight of water were added to 150 parts by weight of the pulverized material and 200 parts by weight of aggregate having a grain size of 0.5 to 2.38 mm prepared by coarsely pulverizing the sludge slag, thereby obtaining samples of 4-hour, 8-hour, and 16-hour curing at 80° C.

Example 4-48

The pulverized material of lime-based sludge slag of Example 4-44 was used to prepare a sample through mixing and curing under conditions similar to those of Example 4-1 except that 80 parts by weight of water glass No. 1 and 16 parts by weight of water were added to 150 parts by weight of the pulverized material and 200 parts by weight of aggregate having a grain size of 0.5 to 2.38 mm prepared by coarsely pulverizing the sludge slag, thereby obtaining samples of 4-hour, 8-hour, and 16-hour curing at 80° C.

Example 4-49

The pulverized material of lime-based sludge slag of Example 4-44 was used to prepare a sample through mixing and curing under conditions similar to those of Example 4-1 except that 180 parts by weight of water glass No. 1 and 7.5 parts by weight of water were added to 300 parts by weight of the pulverized material and 300 parts by weight of aggregate having a grain size of 0.5 to 2.38 mm prepared by coarsely pulverizing the sludge slag, thereby obtaining samples of 4-hour, 8-hour, and 16-hour curing at 80° C.

Example 4-50

The pulverized material of lime-based sludge slag of Example 4-44 was used to prepare a sample through mixing and curing under conditions similar to those of Example 4-1 except that 200 parts by weight of water glass No. 1 was added to 200 parts by weight of the pulverized material and 200 parts by weight of aggregate having a grain size of 0.5 to 2.38 mm prepared by coarsely pulverizing the sludge slag, thereby obtaining samples of 4-hour, 8-hour, and 16-hour curing at 80° C.

Example 4-51

The pulverized material of lime-based sludge slag of Example 4-44 was used to prepare a sample through mixing and curing under conditions similar to those of Example 3-1 except that 400 parts by weight of water glass No. 1 was added to 200 parts by weight of the pulverized material and 200 parts by weight of aggregate having a grain size of 0.5 to 2.38 mm prepared by coarsely pulverizing the sludge slag, thereby obtaining samples of 4-hour, 8-hour, and 16-hour curing at 80° C.

Example 4-52

The pulverized material of lime-based sludge slag of Example 4-44 was used to prepare a mixture in a manner similar to that of Example 4-1 except that 450 parts by weight of water glass No. 1 and 40 parts by weight of water were added to 900 parts by weight of the pulverized material and 900 parts by weight of aggregate having a grain size of 0.5 to 2.38 mm prepared by coarsely pulverizing the sludge slag. The resulting mixture was mixed under conditions similar to those of Example 4-1. The mixed mixture was charged into a mold for forming a sample having a size of 4 cm×4 cm×8 cm while vibration was applied to the mold, followed by curing in a humid environment at 20° C. to thereby obtain samples of 3-day, 7-day, and 28-day curing.

Example 4-53

The pulverized material of lime-based sludge slag of Example 4-44 was used to prepare a mixture in a manner similar to that of Example 4-1 except that 450 parts by weight of water glass No. 1 and 40 parts by weight of water were added to 900 parts by weight of the pulverized material and 900 parts by weight of aggregate having a grain size of 0.5 to 2.38 mm prepared by coarsely pulverizing the sludge slag. The resulting mixture was mixed under conditions similar to those of Example 4-1. The mixed mixture was charged into a mold for forming a sample having a size of 4 cm×4 cm×8 cm while vibration was applied to the mold. The thus-formed material was cured for 3 days in a humid environment at 20° C., and subsequently cured under water at 20° C., thereby obtaining samples of 14-day and 28-day curing after formation.

Example 4-54

The pulverized material of lime-based sludge slag of Example 4-44 was used to prepare a mixture in a manner similar to that of Example 4-1 except that 297 parts by weight of water glass No. 1 and 60 parts by weight of water were added to 630 parts by weight of the pulverized material and 1170 parts by weight of aggregate having a grain size of 0.5 to 2.38 mm prepared by coarsely pulverizing the sludge slag. The resulting mixture was mixed under conditions similar to those of Example 4-1. The mixed mixture was charged into a mold for forming a sample having a size of 4 cm×4 cm×8 cm while vibration was applied to the mold, followed by curing in a humid environment at 20° C. to thereby obtain samples of 3-day, 7-day, and 28-day curing.

Example 4-55

Polymer-based sludge-incinerated ashes were melted in an electric furnace at a temperature of 1400° C. for 1 hour. The resultant melt was poured into water to obtain vitric polymer-based sludge slag (material from Saitama Prefectural Sewerage Corp. having the following major chemical composition (wt. %): $SiO_2$ 29.6, $Al_2O_3$ 16.6, $Fe_2O_3$ 13.4, CaO 10.0, MgO 3.5, $P_2O_5$ 20.5, $SO_2$ 0.0, $Na_2O$ 0.97, $K_2O$ 2.43, and others). This sludge slag was pulverized in 200 g portions in a disk mill for 10 minutes such that about 9 wt. % of residue was left on a 90 $\mu$m sieve. To 450 parts by weight of the thus-pulverized material and 450 parts by weight of aggregate having a grain size of 0.5 to 2.38 mm prepared by coarsely pulverizing the sludge slag, were added 270 parts by weight of water glass No. 1 and 22.5 parts by weight of water. The resulting mixture was processed through mixing and curing under conditions similar to those of Example 4-1, thereby obtaining samples of 4-hour, 8-hour, and 16-hour curing at 80° C.

Some 8-hour-cured samples were immersed in 10% hydrochloric acid and sulfuric acid solutions for 7 and 14 days, respectively, to thereby prepare acid-resistance-tested samples.

Example 4-56

A sample was prepared through mixing and curing under conditions similar to those of Example 4-1 except that 150 parts by weight of the pulverized material of polymer-based sludge slag of Example 4-55, 150 parts by weight of aggregate having a grain size of 0.5 to 2.38 mm prepared from the polymer-based sludge slag, and 90 parts by weight of a soda aluminate solution (product #2019 manufactured by Asada Kagaku, Co., Ltd.) were used, thereby obtaining samples of 8-hour and 16-hour curing at 80° C.

Example 4-57

Sludge slag (major chemical composition (wt. %): $SiO_2$ 46.3, $Al_2O_3$ 18.4, $Fe_2O_3$ 9.0, CaO 9.4, MgO 3.0, $P_2O_5$ 7.7, $SO_3$ 0.0, $Na_2O$ 1.51, $K_2O$ 1.51, and others) from Metropolitan Tokyo was pulverized in 200 g portions in a disk mill for 10 minutes such that about 8 wt. % of residue was left on a 90 μm sieve and about 23 wt. % of residue was left on a 63 μm sieve (a Blaine value of about 2500 $cm^2/g$). To 600 parts by weight of the thus-pulverized material, were added 180 parts by weight of water glass No. 1 and 36 parts by weight of water. The resultant mixture was mixed in a Hobart mixer. The mixed mixture was charged into a mold for forming a sample having a size of 2 cm×2 cm×8 cm while vibration was applied to the mold.

The charged mold was placed in a thermostat-hygrostat chamber (manufactured by Tabai) which was set to a temperature of 20° C. Subsequently, the temperature of the chamber was raised from 20° C. to 80° C. over 3 hours at a relative humidity of 98%, and subsequently the chamber was maintained at 80° C. for 4 hours (8 hours) (curing time), thereby obtaining a sample. Some 8-hour-cured samples were immersed in 10% hydrochloric acid and sulfuric acid solutions for 7 days to thereby prepare acid-resistance-tested samples.

Example 4-58

97.5 parts by weight of a soda aluminate solution (product #2019 manufactured by Asada Kagaku, Co., Ltd.) was added to 300 parts by weight of the pulverized material of polymer-based sludge slag of Example 4-57. Subsequently, the resulting mixture was processed in a manner similar to that of Example 4-57, thereby obtaining samples of 8-hour and 16-hour curing at 80° C.

Example 4-59

A sample was prepared through mixing and curing under conditions similar to those of Example 4-1 except that 150 parts by weight of the pulverized material of polymer-based sludge slag of Example 4-57, 150 parts by weight of aggregate having a grain size of 0.5 to 2.38 mm prepared from the polymer-based sludge slag, and 82.5 parts by weight of a soda aluminate solution (product #2019 manufactured by Asada Kagaku, Co., Ltd.) were used, thereby obtaining samples of 8-hour and 16-hour curing at 80° C.

Example 4-60

Lime-based sludge-incinerated ashes were melted in an electric furnace at a temperature of 1550° C. for 1 hour. The resultant melt was poured into water to obtain vitric sludge slag (material from Saitama Prefectural Sewerage Corp. having the following major chemical composition (wt. %): $SiO_2$ 14.3, $Al_2O_3$ 10.6, $Fe_2O_3$ 21.7, CaO 41.3, MgO 3.8, $P_2O_5$ 5.7, $SO_3$ 0.1, $Na_2O$ 0.27, $K_2O$ 0.38, and others). This sludge slag was pulverized in 200 g portions in a disk mill for 10 minutes such that about 9 wt. % of residue was left on a 90 um sieve. To 300 parts by weight of the thus-pulverized material and 300 parts by weight of aggregate having a grain size of 0.5 to 2.38 mm prepared by coarsely pulverizing the sludge slag, were added 180 parts by weight of water glass No. 1 and 15 parts by weight of water. The resulting mixture was mixed in a manner similar to that of Example 4-1. However, the mixture began to set during mixing, indicating quick-hardening properties. Thus, a sample for strength measurement use was not prepared from the mixture.

An X-ray analysis of the powder revealed that this sludge slag was not completely vitrified.

Example 4-61

Crushed stone sludge (material supplied by Aritune Kogyo Co., Ltd. having the following major chemical composition (wt. %): $SiO_2$ 54.4, $Al_2O_3$ 18.6, $Fe_2O_3$ 6.2, CaO 5.6, MgO 2.8, $Na_2O$ 3.08, $K_2O$ 1.67, and others) was melted in an electric furnace at temperatures of 1500° C. (for 1 hour) and 1400° C. (for 1 hour). The resultant melt was poured into water to obtain vitric crushed-stone sludge slag. A sample was prepared through mixing and curing under conditions similar to those of Example 4-1 except that this crushed-stone sludge slag was used, thereby obtaining samples of 4-hour, 8-hour, and 16-hour curing at 80° C. The sludge slag was pulverized in 200 g portions in a disk mill for 10 minutes to a fineness of 2100 $cm^2/g$ in Blaine value. To 600 parts by weight of the thus-pulverized material, were added 180 parts by weight of water glass No. 1 and 30 parts by weight of water. The resulting mixture was processed through mixing and curing under conditions similar to those of Example 4-1, thereby obtaining samples of 4-hour, 8-hour, and 16-hour curing at 80° C.

Example 4-62

The pulverized material of crushed-stone sludge slag of Example 4-61 was used to prepare a sample through mixing and curing under conditions similar to those of Example 4-61 except that 180 parts by weight of water glass No. 3 as alkali silicate was added to 600 parts by weight of the pulverized material, thereby obtaining samples of 4-hour, 8-hour, and 16-hour curing at 80° C.

Example 4-63

The pulverized material of crushed-stone sludge slag of Example 4-61 and a soda aluminate solution (product #2019 manufactured by Asada Kagaku, Co., Ltd.) as alkali aluminate were used to prepare a sample through mixing and curing under conditions similar to those of Example 4-61, thereby obtaining samples of 4-hour, 8-hour, and 16-hour curing at 80° C.

Comparative Example 4-1

Each of the pulverized materials of refuse slag of Examples 4-1, 4-11, 4-16, 4-19, and 4-27 was used to prepare a mixed mixture under mixing conditions similar to those of Example 3-1 (however, alkali silicate and alkali aluminate were not used). The thus-mixed mixture underwent forming in a manner similar to that of Example 4-1, followed by curing for 4 to 16 hours at 80° C. However, none of the thus-prepared samples set.

Comparative Example 4-2

100 g of incineration ashes, which precede refuse slag and sludge slag of corresponding Examples, was placed in each of a plurality of beakers. Various mixtures of 30 parts by weight of soda silicate No. 1 or soda aluminate (product #2019 manufactured by Asada Kagaku Kogyo, Co., Ltd) and water ranging in content from 5 to 60 parts by weight were mixed. Through use of these materials, samples were prepared through curing for 4 to 16 hours at 80° C. in a manner similar to that of Example 3-1.

Samples prepared from refuse-incinerated ashes (fly ashes) of Kumagaya City and sludge-incinerated ashes did not set. On the other hand, samples prepared from refuse-incinerated ashes of Yokohama City and refuse-incinerated ashes (principal ashes) of Kumagaya City somewhat set, but merely to such an extent that the hardened products can be broken with a hand.

Comparative Example 4-3

The pulverized material of lime-based sludge slag of Example 4-44 was used to prepare a mixed mixture under mixing conditions similar to those of Example 4-44 (however, alkali silicate was not used). The thus-mixed mixture underwent forming in a manner similar to that of Example 4-1, followed by curing for 4 to 16 hours at 80° C. However, the thus-prepared sample did not set.

Comparative Example 4-4

Sludge-incinerated ashes, which precede the lime-based sludge slag of Example 4-44, and polymer-based sludge-incinerated ashes of Example 4-56 were used. 100 parts by weight of each kind of these ashes was placed in each of a plurality of beakers. Various mixtures of 30 parts by weight of each of water glass No. 1 and soda aluminate and water ranging in content from 5 to 60 parts by weight were Mixed. Through use of these materials, samples were prepared through curing for 4 to 16 hours at 80° C. in a manner similar to that of Example 4-1. The thus-prepared samples did not set.

The chemical composition of refuse- and sludge-incinerated ashes is not much different from that of vitrified slag produced from these ashes, except for those components such as S and Cl components which are highly likely to vaporize during slagging, and heavy metal such as lead. A conceivable reason for absence of hardening through reaction with alkali silicate or alkali aluminate is that compounds which constitute incineration ashes are in a Refuse-incinerated ashes of Yokohama City and refuse-incinerated ashes (principal ashes) of Kumagaya City shown in the Comparative Example has a property of somewhat setting when mixed with alkali silicate or alkali aluminate. A conceivable reason for this is that these refuse-incinerated ashes may contain some fused substance and water-soluble substances such as salts and chlorides, which may impart a certain setting property. However, hardened products obtained from the incineration ashes are not strong enough to endure actual use.

In the above-described Examples, an electric furnace is set to a temperature at least 50° to 100° C. higher than a lowest melting temperature in order to accelerate a melting process and to readily pour out a molten substance from its container. Further, it is confirmed that even when an incineration substance is melted at its lowest melting temperature, the substance becomes a good hardening material if it is vitrified.

Tables 8 to 12 show measurements of compressive strength for samples obtained in the above-described Examples 4-1 to 4-63.

TABLE 8

| | Composition of slag (wt. %) | | | | | | | | | Formulation (parts by weight) | | | | Curing Conditions (°C.-hours or days) | | |
|---|---|---|---|---|---|---|---|---|---|---|---|---|---|---|---|---|
| | | | | | | | | | | Slag | | | | strength | | |
| | $SiO_2$ | CaO | $Al_2O_3$ | $Fe_2O_3$ | MgO | $R_2O$ | $P_2O_5$ | Cl | C/S | powder | agg. | Stimul. | Water | ($kgf/cm^2$) | | |
| Ex. 4-1 | 39.1 | 20.3 | 15.6 | 12.3 | 3.3 | 4.11 | 1.7 | 0.2 | 0.56 | Pulv. 600 | | No. 1 180 | 30 | 80-4 1117 | 80-8 1238 | 80-16 1318 |
| Ex. 4-2 | | | | " | | | | | 0.56 | Pulv. 600 | | No. 3 180 | | 80-4 263 | 80-8 463 | 80-16 607 |
| Ex. 4-3 | | | | " | | | | | 0.56 | Pulv. 600 | | No. 1 180 | 30 | 20° C. 3 days 673 | | 20° C. 3 days 799 |
| Ex. 4-4 | | | | " | | | | | 0.56 | Pulv. 200 | Agg. 200 | No. 1 120 | 10 | 80-4 700 | 80-8 748 | 80-16 792 |
| Ex. 4-5 | | | | " | | | | | 0.56 | Pulv. 200 | Agg. 200 | No. 3 120 | | 80-4 68 | 80-8 194 | 80-16 359 |
| Ex. 4-6 | | | | " | | | | | 0.56 | Pulv. 200 | Agg. 200 | #2019 120 | | 80-4 269 | 80-8 305 | 80-16 473 |
| Ex. 4-7 | | | | " | | | | | 0.56 | Pulv. 200 | Agg. 200 | #1219 120 | | 80-4 136 | 80-8 176 | 80-16 191 |
| Ex. 4-8 | 35.1 | 27.2 | 14.4 | 11.9 | 2.9 | 3.39 | 1.5 | | 0.83 | Pulv. 600 | | No. 1 180 | 30 | 80-4 1169 | 80-8 1447 | 80-16 1643 |
| Ex. 4-9 | | | | " | | | | | 0.83 | Pulv. 600 | | No. 1 180 | 30 | 3 days 560 | 7 days 643 | 28 days 956 |
| Ex. 4-10 | | | | " | | | | | 0.83 | Pulv. 600 | | No. 3 180 | | 80-4 364 | 80-8 538 | 80-16 611 |
| Ex. 4-11 | 31.5 | 34.4 | 13.3 | 10.3 | 2.7 | 2.71 | 1.4 | | 1.17 | Pulv. 600 | | No. 1 180 | 30 | 80-4 1443 | 80-8 1615 | 80-16 1716 |
| Ex. 4-12 | | | | " | | | | | 1.17 | Pulv. 600 | | No. 1 180 | 30 | 3 days 673 | 7 days 799 | 28 days 1025 |
| Ex. 4-13 | | | | " | | | | | 1.17 | Pulv. 600 | | No. 3 180 | | 80-4 765 | 80-8 1134 | 80-16 1281 |
| Ex. 4-14 | 27.4 | 39.0 | 18.2 | 8.1 | 2.1 | 2.14 | 1.2 | | 1.52 | Pulv. 600 | | No. 1 180 | 30 | 80-4 1070 | 80-8 1231 | 80-16 1289 |
| Ex. 4-15 | 21.9 | 40.7 | 24.0 | 6.7 | 1.8 | 1.83 | 0.9 | | 1.99 | Immediately set. Sampled could not be prepared. | | | | | | |

TABLE 9

| Ex. 4-16 | 54.3 | 7.7 | 17.9 | 6.8 | 3.5 | 4.73 | 0.4 | | 0.15 | Pulv. 600 | | No. 1 180 | 30 | 80-4 351 | 80-8 482 | 80-16 553 |

TABLE 9-continued

| Ex. | | | | | | | | | | | | | | | | | | |
|---|---|---|---|---|---|---|---|---|---|---|---|---|---|---|---|---|---|---|
| Ex. 4-17 | | | | " | | | | | 0.15 | Pulv. 600 | | No. 3 180 | | | | 80-4 54 | 80-8 112 | 80-16 162 |
| Ex. 4-18 | | | | " | | | | | 0.15 | Pulv. 600 | | #2019 120 | | | | 80-4 190 | 80-8 291 | 80-16 367 |
| Ex. 4-19 | 36.6 | 23.4 | 17.7 | 5.9 | 3.8 | 5.24 | 3.5 | | 0.68 | Pulv. 200 | Agg. 200 | No. 1 20 | | 36 | | 80-4 75 | 80-8 145 | 80-16 168 |
| Ex. 4-20 | | | | " | | | | | 0.68 | Pulv. 200 | Agg. 200 | No. 1 40 | | 32 | | 80-4 528 | 80-8 770 | 80-16 919 |
| Ex. 4-21 | | | | " | | | | | 0.68 | Pulv. 200 | Agg. 200 | No. 1 80 | | 16 | | 80-4 650 | 80-8 793 | 80-16 869 |
| Ex. 4-22 | | | | " | | | | | 0.68 | Pulv. 200 | Agg. 200 | No. 1 120 | | 8 | | 80-4 602 | 80-8 645 | 80-16 669 |
| Ex. 4-23 | | | | " | | | | | 0.68 | Pulv. 200 | Agg. 200 | No. 1 200 | | | | 80-4 375 | 80-8 416 | 80-16 393 |
| Ex. 4-24 | | | | " | | | | | 0.68 | Pulv. 200 | Agg. 200 | No. 1 400 | | | | 80-4 144 | 80-8 154 | 80-16 110 |
| Ex. 4-25 | | | | " | | | | | 0.68 | Pulv. 200 | Agg. 200 | No. 3 80 | | | | 80-4 62 | 80-8 224 | 80-16 428 |
| Ex. 4-26 | | | | " | | | | | 0.68 | Pulv. 200 | Agg. 200 | #2019 80 | | | | 80-4 349 | 80-8 456 | 80-16 584 |
| Ex. 4-27 | 30.6 | 30.9 | 19.1 | 2.0 | 5.6 | 2.01 | 2.2 | | 0.92 | Pulv. 600 | | No. 1 180 | | 30 | | 80-4 934 | 80-8 1202 | 80-16 1372 |
| Ex. 4-28 | | | | " | | | | | 0.92 | Pulv. 600 | | No. 3 180 | | | | 80-4 97 | 80-8 325 | 80-16 424 |
| Ex. 4-29 | | | | " | | | | | 0.92 | Pulv. 600 | | #2019 180 | | | | 80-4 951 | 80-8 1117 | 80-16 1275 |
| Ex. 4-30 | 34.1 | 26.3 | 17.5 | 5.0 | 4.1 | 2.91 | 3.1 | — | 0.83 | Pulv. 200 | Agg. 200 | No. 1 90 | | 10 | | 80-4 801 | 80-8 895 | 80-16 1275 |
| Ex. 4-31 | | | | " | | | | | 0.83 | Pulv. 200 | Agg. 200 | No. 3 90 | | | | 80-4 63 | 80-8 194 | 80-16 353 |
| Ex. 4-32 | | | | " | | | | | 0.83 | Pulv. 200 | Agg. 200 | #2019 90 | | | | 80-4 473 | 80-8 494 | 80-16 722 |
| Ex. 4-33 | 54.6 | 17.6 | 9.7 | 3.1 | 2.0 | 8.87 | 1.7 | 0.1 | 0.35 | Pulv. 600 | | No. 1 180 | | 30 | | 80-4 45 | 80-8 131 | 80-16 129 |

TABLE 10

| Ex. 4-34 | 54.6 | 17.6 | 9.7 | 3.1 | 2.0 | 8.87 | 1.7 | 0.1 | 0.35 | Pulv. 600 | | No. 3 180 | | | | 80-4 164 | 80-8 163 | 80-16 224 |
|---|---|---|---|---|---|---|---|---|---|---|---|---|---|---|---|---|---|---|
| Ex. 4-35 | | | | " | | | | | 0.35 | Pulv. 600 | | #2019 180 | | | | 80-4 181 | 80-8 144 | 80-16 191 |
| Ex. 4-36 | 54.6 | 7.7 | 18.1 | 6.7 | 3.5 | 4.73 | 0.4 | 0.0 | 0.15 | Pulv. 600 | | No. 1 180 | | 30 | | 80-4 328 | 80-8 519 | 80-16 645 |
| Ex. 4-37 | | | | " | | | | | 0.15 | Pulv. 600 | | No. 3 180 | | | | 80-4 65 | 80-8 163 | 80-16 323 |
| Ex. 4-38 | | | | " | | | | | 0.15 | Pulv. 600 | | #2019 180 | | | | 80-4 181 | 80-8 144 | 80-16 191 |
| Ex. 4-39 | 36.6 | 21.5 | 18.8 | 8.2 | 3.7 | 4.57 | 2.5 | 0.3 | 0.63 | Pulv. 800 | | No. 1 540 | | 90 | | 80-4 186 | 80-8 189 | 80-16 213 |
| Ex. 4-40 | | | | " | | | | | 0.63 | Pulv. 800 | | No. 3 540 | | | | 80-4 22 | 80-8 36 | 80-16 85 |
| Ex. 4-41 | | | | " | | | | | 0.63 | Pulv. 800 | | #2019 540 | | | | 80-4 134 | 80-8 147 | 80-16 189 |
| Ex. 4-42 | 37.1 | 19.3 | 14.9 | 11.6 | 3.1 | 7.34 | 1.5 | F 2.1 | 0.56 | Pulv. 600 | | No. 3 180 | | | | 80-4 148 | 80-8 418 | 80-16 546 |
| Ex. 4-43 | 31.0 | 26.5 | 12.6 | 9.7 | 2.6 | 3.23 | 9.6 | — | 0.92 | Pulv. 600 | | No. 1 180 | | | | 80-4 743 | 80-8 811 | 80-16 834 |
| Ex. 4-44 | 33.4 | 33.9 | 14.2 | 5.0 | 2.4 | 1.85 | 7.0 | — | 1.08 | Pulv. 900 | | No. 1 270 Immersion in 10% HCl Immersion in 10% $H_2SO_4$ | | 45 | | 80-4 458 7 days 352 7 days 317 | 80-8 659 | 80-16 1257 14 days 476 14 days 502 |
| Ex. 4-45 | | | | " | | | | | 1.08 | Pulv. 900 | | No. 3 270 Immersion in 10% HCl Immersion in 10% $H_2SO_4$ | | | | 80-4 153 7 days 148 7 days 176 | 80-8 222 | 80-16 395 14 days 266 14 days 240 |
| Ex. 4-46 | | | | " | | | | | 1.08 | Pulv. 200 | Agg. 200 | No. 1 20 | | 32 | | 80-4 313 | 80-8 651 | 80-16 673 |
| Ex. 4-47 | | | | " | | | | | 1.08 | Pulv. 200 | Agg. 200 | No. 1 40 | | 24 | | 80-4 628 | 80-8 1066 | 80-16 1064 |
| Ex. 4-48 | | | | " | | | | | 1.08 | Pulv. 200 | Agg. 200 | No. 1 80 | | 16 | | 80-4 739 | 80-8 905 | 80-16 1075 |

TABLE 11

| Ex. 4-49 | 33.4 | 33.9 | 14.2 | 5.0 | 2.4 | 1.85 | 7.0 | — | 1.08 | Pulv. 300 | Agg. 300 | No. 3 180 | 7.5 | 80-4 396 | 80-8 775 | 80-16 941 |
|---|---|---|---|---|---|---|---|---|---|---|---|---|---|---|---|---|
| Ex. 4-50 | | | | " | | | | | 1.08 | Pulv. 200 | Agg. 200 | No. 1 200 | | 80-4 393 | 80-8 458 | 80-16 476 |
| Ex. 4-51 | | | | " | | | | | 1.08 | Pulv. 200 | Agg. 200 | No. 1 400 | | 80-4 131 | 80-8 133 | 80-16 124 |
| Ex. 4-52 | | | | " | | | | | 1.08 | Pulv. 900 | Agg. 900 | No. 1 450 | 40 | \multicolumn{3}{c}{Curing in humid environment (20° C.)} |
| | | | | | | | | | | | | | | 3 days 167 | 7 days 353 | 28 days 525 |
| Ex. 4-53 | | | | " | | | | | 1.08 | Pulv. 900 | Agg. 900 | No. 1 450 | 40 | \multicolumn{3}{c}{Curing in water (° C.)} |
| | | | | | | | | | | | | | | | 14 days 395 | 28 days 539 |
| Ex. 4-54 | | | | " | | | | | 1.08 | Pulv. 630 | Agg. 1170 | No. 1 297 | 60 | \multicolumn{3}{c}{Curing in humid environment (20° C.)} |
| | | | | | | | | | | | | | | 3 days 216 | 7 days 359 | 28 days 548 |
| Ex. 4-55 | 29.6 | 10.0 | 16.6 | 13.4 | 3.5 | 3.38 | 20.4 | — | 0.34 | Pulv. 450 | Agg. 450 | No. 1 270 | 22.5 | 80-4 553 | 80-8 561 | 80-16 591 |
| | | | | | | | | | | Immersion in 10% HCl | | | | | 7 days 236 | 14 days 381 |
| | | | | | | | | | | Immersion in 10% H$_2$SO$_4$ | | | | | 7 days 231 | 14 days 440 |
| Ex. 4-56 | | | | " | | | | | 0.34 | Pulv. 150 | Agg. 150 | #2019 90 | | 80-4 — | 80-8 34 | 80-16 129 |
| Ex. 4-57 | 46.3 | 9.4 | 18.4 | 9.0 | 3.0 | 3.02 | 7.7 | — | 0.20 | Pulv. 600 | | No. 1 180 | 36 | 80-4 481 | 80-8 519 | |
| | | | | | | | | | | Immersion in 10% HCl | | | | | 7 days 510 | |
| | | | | | | | | | | Immersion in 10% H$_2$SO$_4$ | | | | | 7 days 500 | |
| Ex. 4-58 | | | | " | | | | | 0.20 | Pulv. 300 | | #2019 97.5 | | 80-4 | 80-8 176 | 80-16 212 |
| Ex. 4-59 | | | | " | | | | | 0.20 | Pulv. 150 | Agg. 150 | #2019 82.5 | | 80-4 | 80-8 133 | 80-16 355 |
| Ex. 4-60 | 300td 14.3 | 41.3 | 10.6 | 21.7 | 3.8 | 0.65 | 5.7 | — | 3.09 | Pulv. 300 | Agg. 300 | No. 3 180 | 15 | \multicolumn{3}{c}{Quick setting} |
| Ex. 4-61 | \multicolumn{8}{l}{Chemical composition of crushed stone sludge} | 0.15 | Pulv. 600 | | No. 1 180 | 30 | 80-4 328 | 80-8 519 | 80-16 645 |
| | 54.3 | 7.7 | 17.9 | 6.8 | 3.5 | 4.53 | 0.4 | — | | | | | | | | |

TABLE 12

| Ex. 4-62 | \multicolumn{8}{l}{Chemical composition of crushed stone sludge} | 0.15 | Pulv. 600 | No. 3 180 | 80-4 65 | 80-8 163 | 80-16 323 |
|---|---|---|---|---|---|---|---|---|---|---|---|---|---|---|
| | 54.3 | 7.7 | 17.9 | 6.8 | 3.5 | 4.53 | 0.4 | — | | | | | | |
| Ex. 4-63 | | | | " | | | | | 0.15 | Pulv. 600 | #2019 180 | 80-4 170 | 80-8 366 | 80-16 455 |

As is apparent from Tables 8 to 12, a variety of fused slags produced from refuse-incinerated substances or from incinerated swage sludge and industrial watstes such as crushed stone sludge can be prepared into a slag composition of the present invention, and when the resultant slag composition is combined with an alkaline activator such as water glass, sodium aluminate, or sodium silicate so as to form a hardening composition of the present invention, it is possible to obtain a hardened product having excellent strength through a simple procedure of mixing with water and curing the resultant mixture.

As shown in Examples 4-44, 4-45, 4-55, and 4-57, the hardened products of the present invention, particularly the hardened products which made use of alkali silicate exhibited quite excellent resistance against acids.

Although no comparative data are shown in terms of the resistance against acids, comparative test were performed by use of mortar samples, each having a size of 2 cm×2 cm×2 cm, which had been prepared in accordance with the JIS method for preparing samples for testing strength of mortar of portland cement, after curing at 80° C. for 8 hours. The samples that were immersed in 10% HCl collasped in 1–2 days, and those immersed in 10% H$_2$SO$_4$ collapsed after passage of 7 days, and therefore, their strength could not be measured.

Example 5-1

Lime-based sludge slag (material from Osaka Municipal Sewerage Corp. having the following major chemical composition (wt. %): SiO$_2$ 33.4, Al$_2$O$_3$ 14.2, Fe$_2$O$_3$ 5.0, CaO 33.9, MgO 2.4, P$_2$O$_5$ 7.0, S 1.1, Na$_2$O 0.75, K$_2$O 0.68, and others) (C/S=1.10) was pulverized in a ball mill so as to obtain samples having pulverized degrees by Blaine value of 3,500 and 4,500 cm$^2$/g. To each sample (5 parts by weight) was added 95 parts by weight of ordinary portland cement of Chichibu-Onoda brand, to thereby prepare a cement composition. The SO$_3$ content of the mixed cements was adjusted to 2 wt. % for samples having a Blaine value of 3,500 cm$^2$/g, and to 2 wt. % or 3 wt. % for samples having a Blaine value of 4,500 cm$^2$/g. Thus, three different kinds of mixed cement samples were obtained. These mixed cements, through use of ISO standard sand, were mixed and molded in accordance with the ISO test method for determining mortar strength (cement: sand=1:3, water-cement ratio: 50%, 4 cm ×4 cm×16 cm). The resultant product was cured for one day in a humid atmosphere at 20° C. Thereafter, the mold was removed, followed by curing in water. Compressive strength of each sample was measured on day 3, 7, 28, and 91. The finally cured product was subjected to an X-ray analysis, to thereby obtain the residual amount of $Ca(OH)_2$.

Example 5-2

The procedure of Example 5-1 was repeated, except that the crushed sludge slag product of Example 5-1 was used in amounts of 20 parts by weight and ordinary portland cement was used in amounts of 80 parts by weight, to thereby determine the compressive strength on day 3, 7, 28, and 91. Also, the amount of $Ca(OH)_2$ remaining in the hardened product was checked.

Example 5-3

The procedure of Example 5-1 was repeated, except that the crushed sludge slag product of Example 5-1 was used in amounts of 40 parts by weight and ordinary portland cement was used in amounts of 60 parts by weight, to thereby determine the compressive strength on day 3, 7, 28, and 91. Also, the amount of $Ca(OH)_2$ remaining in the hardened product was checked.

Example 5-4

The procedure of Example 5-1 was repeated, except that the crushed sludge slag product of Example 5-1 was replaced by 5 parts by weight of polymer-based sludge-incinerated fused slag (major chemical composition (wt. %): $SiO_2$ 46.3, $Al_2O_3$ 18.4, $Fe_2O_3$ 9.0, CaO 9.4, MgO 3.0, $P_2O_5$ 14.1, $Na_2O$ 1.37, $K_2O$ 2.69, and others) (C/S=0.21) from Metropolitan Tokyo, and that the amount of ordinary cement was 95 parts by weight, to thereby determine the compressive strength on day 3, 7, 28, and 91. Also, the amount of $Ca(OH)_2$ remaining in the hardened product was checked.

Example 5-5

The procedure of Example 5-1 was repeated, except that the sludge-incinerated fused slag of Example 5-4 was used in amounts of 20 parts by weight and ordinary portland cement was used in amounts of 80 parts by weight, to thereby determine the compressive strength on day 3, 7, 28, and 91.

Example 5-6

The procedure of Example 5-1 was repeated, except that the sludge-incinerated fused slag of Example 5-4 was used in amounts of 40 parts by weight and ordinary portland cement was used in amounts of 60 parts by weight, to thereby determine the compressive strength on day 3, 7, 28, and 91. Also, the amount of $Ca(OH)_2$ remaining in the hardened product was checked.

Example 5-7

The procedure of Example 5-1 was repeated, except that the crushed sludge slag product of Example 5-1 was replaced by 5 parts by weight of fused slag produced from refuse-incinerated substances (major chemical composition (wt. %): $SiO_2$ 38.1, $Al_2O_3$ 17.2, $Fe_2O_3$ 12.1, CaO 19.6, MgO 3.2, $SO_3$ 0.6, $Na_2O$ 2.61, $K_2O$ 1.34, $TiO_2$ 1.74, $P_2O_5$ 1.6, and others) (C/S=0.53) which had been poured into water for quenching, and that the amount of ordinary cement was 95 parts by weight, to thereby determine the compressive strength on day 3, 7, 28, and 91 (for the sample having a Blaine value of 4,500 $cm^2/g$ only). The amount of $Ca(OH)_2$ remaining in the hardened product was also checked. The fused slag produced from refuse-incinerated substances used in this test was prepared by placing refuse-incinerated ashes of Yokohama City in an alumina container, melting the ashes in an electric furnace for 1 hour at 1,400° C., and then pouring the melt into water for quenching.

Example 5-8

The procedure of Example 5-1 was repeated, except that the refuse-incinerated fused slag of Example 5-7 was used in amounts of 20 parts by weight and ordinary portland cement was used in amounts of 80 parts by weight, to thereby determine the compressive strength on day 3, 7, 28, and 91 (for the sample having a Blaine value of 4,500 $cm^2/g$ only). The amount of $Ca(OH)_2$ remaining in the hardened product was also checked.

Example 5-9

The procedure of Example 5-1 was repeated, except that the refuse-incinerated fused slag of Example 5-7 was used in amounts of 40 parts by weight and ordinary portland cement was used in amounts of 60 parts by weight, to thereby determine the compressive strength on day 3, 7, 28, and 91 (for the sample having a Blaine value of 4,500 $cm^2/g$ only). The amount of $Ca(OH)_2$ remaining in the hardened product was also checked.

Example 10

The procedure of Example 5-1 was repeated, except that the refuse-incinerated fused slag of Example 5-7 was replaced by 5 parts by weight of fused slag produced from refuse-incinerated substances (major chemical composition (wt. %): $SiO_2$ 36.6, $Al_2O_3$ 18.8, $Fe_2O_3$ 8.2, CaO 21.5, MgO 3.7, $Na_2O$ 3.24, $K_2O$ 1.33, $P_2O_5$ 2.6, and others) (C/S=0.60) from Yoshikawa City (previously called "Yoshikawa-machi") in Saitama Prefecture, and that the amount of ordinary cement was 95 parts by weight, to thereby determine the compressive strength on day 3, 7, 28, and 91 (for the sample having a Blaine value of 4,500 $cm_2/g$ only). The amount of $Ca(OH)_2$ remaining in the hardened product was also checked.

Example 5-11

The procedure of Example 5-1 was repeated, except that the refuse-incinerated fused slag of Example 5-10 was used in amounts of 20 parts by weight and ordinary portland cement was used in amounts of 80 parts by weight, to thereby determine the compressive strength on day 3, 7, 28, and 91. The amount of $Ca(OH)_2$ remaining in the hardened product was also checked.

Example 5-12

The procedure of Example 5-1 was repeated, except that the refuse-incinerated fused slag of Example 5-10 was used in amounts of 40 parts by weight and ordinary portland cement was used in amounts of 60 parts by weight, to thereby determine the compressive strength on day 3, 7, 28, and 91 (for the sample having a Blaine value of 4,500 $cm^2/g$ only). The amount of $Ca(OH)_2$ remaining in the hard hardened product was also checked.

Example 5-25

The procedure of Example 5-1 was repeated, except that the following were used: crushed slag product of Example 5-1 5 parts by weight; blast furnace slag provided by Nippon Kokan K. K. 15 parts by weight; ordinary portland cement 80 parts by weight; and $SO_3$ 3 wt. %. The compressive strength of the resultant sample was determined.

Comparative Example 5-1

The procedure of Example 5-1 was repeated, except that the sludge-incinerated fused slag of Example 5-1 was replaced by 5 parts by weight of fused slag blast furnace slag of Nippon Kokan K. K. (major chemical composition: $SiO_2$ 32.2 wt. %, CaO 41.3 wt. %, $Al_2O_3$ 15.0 wt. %, $Fe_2O_3$ 1.0 wt. %, MgO 7.8 wt. %, N) (C/S =1.37), which had been crushed, and that the amount of ordinary cement was 95 parts by weight, to thereby determine the compressive strength on day 3, 7, 28, and 91. The amount of $Ca(OH)_2$ remaining in the hardened product was also checked.

Comparative Example 5-2

The procedure of Example 5-1 was repeated, except that the blast furnace slag of Example 5-1 was used in amounts of 20 parts by weight and ordinary portland cement was used in amounts of 40 parts by weight, to thereby determine the compressive strength on day 3, 7, 28, and 91.

Comparative Example 5-3

The procedure of Example 5-1 was repeated, except that the blast furnace slag of Example 5-1 was used in amounts of 40 parts by weight and ordinary portland cement was used in amounts of 60 parts by weight, to thereby determine the compressive strength on day 3, 7, 28, and 91. The amount of $Ca(OH)_2$ remaining in the hardened product was also checked.

Comparative Example 5-4

The procedure of Example 5-1 was repeated through sole use of ordinary portland cement, to thereby determine the compressive strength on day 3, 7, 28, and 91. The amount of $Ca(OH)_2$ remaining in the hardened product was also checked.

Example 5-13

A sample was prepared through use of special grade chemicals manufactured by Kanto Kagaku Co., Ltd. so that the sample had the following composition: $SiO_2$ 50 wt. %, CaO 0 wt. %, $Al_2O_3$ 30 wt. %, $Fe_2O_3$ 5 wt. %, MgO 5 wt. %, $P_2O_5$ 5 wt. %, and $Na_2O$ 5 wt. % (C/S=0). The sample was heated to melt at 1,370° C. for 60 minutes, at 1,420° C. for 60 minutes, and at 1,520° C. for 20 minutes. Subsequently, the sample was poured into water for quenching to thereby obtain a fused slag.

The fused slag was pulverized in a ball mill to have a pulverized degree expressed by Blaine value of 3,000 $cm^2/g$, and 20 parts by weight of the resultant pulverized slag were mixed with 80 parts by weight of ordinary portland cement of "Chichibu-Onoda" brand, to thereby obtain a mixed cement composition.

The $SO_3$ content in the amount of the mixed cement was adjusted to be 2% by use of natural gypsum. The mixed cement, through use of ISO standard sand, was mixed and molded in accordance with the ISO test method for determining mortar strength (cement: sand=1:3, water-cement ratio: 50%, 4 cm×4 cm×16 cm). The resultant product was placed in a steam curing apparatus (manufactured by Tabai), and the temperature of the apparatus was elevated from room temperature to 80° C. over while maintaining a humid atmosphere. The product was cured for 12 hours in the apparatus, and was cooled to room temperature over 2 hours. The cooled product was removed from the mold and its strength was measured.

Example 5-14

The procedure of Example 5-13 was repeated, except that 40 parts by weight of the fused slag of Example 5-13 and 60 parts by weight of ordinary portland cement were used, to thereby determine the compressive strength of the sample.

Example 5-15

A sample was prepared through use of special grade chemicals manufactured by Kanto Kagaku Co., Ltd. so that the sample had the following composition: SiO2 60 wt. %, CaO 0 wt. %, $Al_2O_3$ 20 wt. %, $Fe_2O_3$ 5 wt. %, MgO 5 wt. %, $Na_2O$ 5 wt. %, $P_2O_5$ 5 wt. %, and F 2.5 wt. % (adjusted by use of NaF). The sample was heated to melt at 1,300° C. for 60 minutes, at 1,400° C. for 30 minutes, and at 1,500° C. for 20 minutes. Subsequently, the sample was poured into water for quenching to thereby obtain a fused slag. The fused slag was processed in a manner similar to that described in Example 5-13, and its compressive strength was measured.

Example 5-16

The procedure of Example 5-13 was repeated, except that fused slag of Example 5-21 was used in different degrees of pulverization, each in an amount of 40 parts by weight, and that 60 parts by weight of ordinary portland cement were used, to thereby determine the compressive strength of the sample.

Example 5-17

A sample was prepared through use of special grade chemicals manufactured by Kanto Kagaku Co., Ltd. so that the sample had the following composition: $SiO_2$ 65 wt. %, CaO 0 wt. %, $Al_2O_3$ 15 wt. %, $Fe_2O_3$ 5 wt. %, MgO 5 wt. %, $Na_2O$ 0 wt. %, and F 2.5 wt. % (adjusted by use of NaF). The sample (C/S=0) was heated to melt at 1,300° C. for 1 hour, at 1,400° C. for 60 minutes, and at 1,500° C. for 20 minutes. Subsequently, the sample was poured into water for quenching to thereby obtain a fused slag. The fused slag was processed in a manner similar to that described in Example 5-13, and its compressive strength was measured.

Example 5-18

The procedure of Example 5-13 was repeated, except that 40 parts by weight of fused slag of Example 5-17 which had been crushed and 60 parts by weight of ordinary portland cement were used, to thereby determine the compressive strength of the sample.

Example 5-19

A sample was prepared through use of special grade chemicals manufactured by Kanto Kagaku Co., Ltd. so that the sample had the following composition: $SiO_2$ 85 wt. %, CaO 0 wt. %, $Al_2O_3$ 0 wt. %, $Fe_2O_3$ 10 wt. %, and $Na_2O$ 5 wt. %. The sample (C/S=0) was heated to melt at 1,500° C. for 1 hour, at 1,550° C. for 40 minutes, and at 1,580° C. for 20 minutes. Subsequently, the sample was poured into water for quenching to thereby obtain a fused slag.

The fused slag was pulverized in a ball mill to have a pulverized degree expressed by Blaine value of 4,500 $cm^2/g$, and 20 parts by weight of the resultant pulverized slag were mixed with 80 parts by weight of ordinary portland cement of "Chichibu-Onoda" brand, to thereby obtain a mixed cement composition. The composition was processed in a manner similar to that described in Example 5-13, and its compressive strength was measured.

Example 5-20

The procedure of Example 5-13 was repeated, except that 40 parts by weight of fused slag of Example 5-19 which had been crushed and 60 parts by weight of ordinary portland cement were used, to thereby determine the compressive strength of the sample.

Example 5-21

A sample was prepared through use of special grade chemicals manufactured by Kanto Kagaku Co., Ltd. so that the sample had the following composition: $SiO_2$ 90 wt. %, CaO 0 wt. %, $Al_2O_3$ 0 wt. %, $Na_2O$ 5 wt. %, and F 5 wt. % (adjusted by use of NaF). The sample (C/S=0) was heated to melt at 1,500° C. for 60 minutes, at 1,550° C. for 60 minutes, and at 1,580° C. for 20 minutes. Subsequently, the sample was poured into water for quenching to thereby obtain a fused slag, and its compressive strength was measured.

Example 5-22

The procedure of Example 5-19 was repeated, except that 40 parts by weight of fused slag of Example 5-21, which had been crushed, and 60 parts by weight of ordinary portland cement were used, to thereby determine the compressive strength of the sample.

Example 5-23

A sample was prepared through use of special grade chemicals manufactured by Kanto Kagaku Co., Ltd. so that the sample had the following composition: $SiO_2$ 50 wt. %, CaO 0 wt. %, $Al_2O_3$ 0 wt. %, $Fe_2O_3$ 10 wt. %, MgO 15 wt. %, and $Na_2O$ 15 wt. % (C/S=0). The sample was heated to melt at 1,200° C. for 1 hour and at 1,300° C. for 1 hour. Subsequently, the sample was poured into water for quenching to thereby obtain a fused slag.

The fused slag was pulverized in a ball mill to have a pulverized degree expressed by Blaine value of 4,500 $cm^2$/g, and 20 parts by weight of the resultant pulverized slag were mixed with 80 parts by weight of ordinary portland cement of "Chichibu-Onoda" brand, to thereby obtain a mixed cement composition. The composition was processed in a manner similar to that described in Example 5-13, and the compressive strength of the composition was measured.

Example 5-24

The procedure of Example 5-13 was repeated, except that the crushed slag product of Example 5-23 was used in amounts of 40 parts by weight and ordinary portland cement was used in 60 parts by weight. The compressive strength of the sample after being cured with steam was determined.

Comparative Example 5-5

The procedure of Example 5-13 was repeated through sole use of ordinary portland cement, to thereby determine the compressive strength of the sample after being cured with steam. The amount of $Ca(OH)_2$ remaining in the hardened product was also checked.

Comparative Example 5-6

The procedure of Example 5-13 was repeated, except that the fused slag of Example 5-21 was replaced by ISO standard sand that had been crushed in a ball mill so as to have a Blaine value of 4,500 $cm^2$/g, and 20 parts by weight of the crushed sand was mixed with 80 parts by weight of ordinary portland cement of "Chichibu-Onoda" brand, to thereby obtain a cement mixture composition. The compressive strength of the composition was determined in a manner similar to that described in Example 5-13.

Comparative Example 5-7

The procedure of Example 5-13 was repeated except that 40 parts by weight of the crushed standard sand described in Comparative Example 5-6 and 60 parts by weight of ordinary portland cement were used, to thereby determine the compressive strength of the sample after being cured with steam.

The compressive strength of each of the samples obtained in Examples 5-1 through 5-25 and Comparative Example 5-1 through 5-7 was measured. Table 13 shows the data obtained for the cases in which the Blaine value of the slags used was 3,500 $cm^2$/g, and Table 14 shows the data obtained for the cases in which the Blaine value of the slags used was 4,500 $cm^2$/g. Table 15 shows the results obtained when the samples were cured with steam.

TABLE 13

| Ex. No. | $CO_3$(%) in cement | Slag composition (wt. %) | | | | | | | | Ratio by mol C/S | Compressive Strength (kgf/$cm^2$)[a] | | | | $Ca(OH)_2$[b] |
|---|---|---|---|---|---|---|---|---|---|---|---|---|---|---|---|
| | | $SiO_2$ | CaO | $Al_2O_3$ | $Fe_2O_3$ | MgO | $Na_2O$ $K_2O$ | $P_2O_5$ | F Cl | | day 3 | day 7 | day 28 | day 91 | |
| Ex. 5-1 | 2.0 | 33.4 | 33.9 | 14.2 | 5.0 | 2.4 | 1.43 | 7.0 | 0.0 | 1.10 | 296 | 414 | 604 | 690 | ⊙ |
| Ex. 5-2 | " | " | " | " | " | " | " | " | " | " | 248 | 385 | 593 | 720 | ○ |
| Ex. 5-3 | " | " | " | " | " | " | " | " | " | " | 180 | 263 | 472 | 662 | Δ |
| Ex. 5-4 | " | 46.3 | 9.4 | 18.4 | 9.0 | 3.0 | 4.09 | 14.1 | 0.0 | 0.21 | 291 | 473 | 603 | 718 | ○ |
| Ex. 5-5 | " | " | " | " | " | " | " | " | " | " | 249 | 384 | 553 | 728 | Δ |
| Ex. 5-6 | " | " | " | " | " | " | " | " | " | " | 155 | 233 | 328 | 373 | X |
| Ex. 5-7 | " | 38.1 | 19.6 | 17.2 | 12.1 | 3.2 | 3.95 | 1.6 | 0.2 | 0.53 | 291 | 426 | 618 | — | ⊙ |
| Ex. 5-8 | " | " | " | " | " | " | " | " | " | " | 260 | 384 | 576 | — | Δ |
| Ex. 5-9 | " | " | " | " | " | " | " | " | " | " | 186 | 249 | 377 | — | X |
| Ex. 5-10 | " | 36.6 | 21.5 | 18.8 | 8.2 | 3.7 | 4.57 | 2.6 | 0.3 | 0.63 | 290 | 451 | 623 | — | ○ |
| Ex. 5-11 | " | " | " | " | " | " | " | " | " | " | 224 | 342 | 557 | — | Δ |
| Ex. 5-12 | " | " | " | " | " | " | " | " | " | " | 138 | 209 | 330 | — | X |
| C. Ex. 5-1 | " | 32.2 | 41.3 | 15.0 | 1.0 | 7.8 | — | — | — | 1.37 | 286 | 423 | 602 | 688 | ⊙ |
| C. Ex. 5-2 | " | " | " | " | " | " | " | " | " | " | 253 | 422 | 620 | 715 | ○ |

TABLE 13-continued

| | Slag composition (wt. %) | | | | | | | | | | Compressive Strength (kgf/cm²)[a] | | | | |
|---|---|---|---|---|---|---|---|---|---|---|---|---|---|---|---|
| Ex. No. | CO₃(%) in cement | SiO₂ | CaO | Al₂O₃ | Fe₂O₃ | MgO | Na₂O K₂O | P₂O₅ | F Cl | Ratio by mol C/S | day 3 | day 7 | day 28 | day 91 | Ca(OH)₂[b] |
| C. Ex. 5-3 | " | " | " | " | " | " | " | " | " | " | 195 | 332 | 589 | 684 | □ |
| C. Ex. 5-4 | " | (Ordinary portland cement) | | | | | | | | | 282 | 454 | 626 | 716 | ⊙ |

(Note)
1) Pulverized degree of slag (Blaine value): 3500 cm²/g
[a] Compressive strength of mortar after being cured in water
[b] Amounts of remaining Ca(OH)₂
⊙ Considerably great amount
○ Great amount
□ Small amount
Δ Very small amount
X None

TABLE 14

| | Slag composition (wt. %) | | | | | | | | | | Compressive Strength (kgf/cm²)[a] | | | | |
|---|---|---|---|---|---|---|---|---|---|---|---|---|---|---|---|
| Ex. No. | CO₃(%) in cement | SiO₂ | CaO | Al₂O₃ | Fe₂O₃ | MgO | Na₂O K₂O | P₂O₅ | F Cl | Ratio by mol C/S | day 3 | day 7 | day 28 | day 91 | Ca(OH)₂[b] |
| Ex. 5-1 | 2.0 | 33.4 | 33.9 | 14.2 | 5.0 | 2.4 | 1.43 | 7.0 | 0.0 | 1.10 | 278 | 441 | 638 | 687 | ⊙ |
| Ex. 5-1 | 3.0 | " | " | " | " | " | " | " | " | " | 367 | 513 | 677 | 738 | |
| Ex. 5-2 | 2.0 | " | " | " | " | " | " | " | " | " | 254 | 400 | 599 | 760 | ○ |
| Ex. 5-2 | 3.0 | " | " | " | " | " | " | " | " | " | 304 | 443 | 636 | 810 | |
| Ex. 5-3 | 2.0 | " | " | " | " | " | " | " | " | " | 182 | 284 | 533 | 670 | Δ |
| Ex. 5-3 | 3.0 | " | " | " | " | " | " | " | " | " | 211 | 369 | 528 | 685 | |
| Ex. 5-4 | 2.0 | 46.3 | 9.4 | 18.4 | 9.0 | 3.0 | 4.09 | 14.1 | 0.0 | 0.21 | 301 | 452 | 635 | 739 | ○ |
| Ex. 5-4 | 3.0 | " | " | " | " | " | " | " | " | " | 371 | 492 | 636 | 751 | |
| Ex. 5-5 | 2.0 | " | " | " | " | " | " | " | " | " | 246 | 371 | 574 | 718 | Δ |
| Ex. 5-5 | 3.0 | " | " | " | " | " | " | " | " | " | 277 | 379 | 555 | 688 | |
| Ex. 5-6 | 2.0 | " | " | " | " | " | " | " | " | " | 159 | 229 | 335 | 373 | X |
| Ex. 5-6 | 3.0 | " | " | " | " | " | " | " | " | " | 161 | 243 | 323 | 352 | |
| Ex. 5-7 | 2.0 | 38.1 | 19.6 | 17.2 | 12.1 | 3.2 | 3.95 | 1.6 | 0.2 | 0.53 | 272 | 467 | 598 | 728 | ○ |
| Ex. 5-7 | 3.0 | " | " | " | " | " | " | " | " | " | 359 | 467 | 608 | 714 | |
| Ex. 5-8 | 2.0 | " | " | " | " | " | " | " | " | " | 237 | 412 | 559 | 726 | Δ |
| Ex. 5-8 | 3.0 | " | " | " | " | " | " | " | " | " | 259 | 387 | 547 | 656 | |
| Ex. 5-9 | 2.0 | " | " | " | " | " | " | " | " | " | 159 | 261 | 423 | 569 | X |
| Ex. 5-9 | 3.0 | " | " | " | " | " | " | " | " | " | 152 | 230 | 385 | 453 | |
| Ex. 5-10 | 2.0 | 36.6 | 21.5 | 18.8 | 8.2 | 3.7 | 4.57 | 2.6 | 0.3 | 0.63 | 281 | 454 | 626 | 724 | ○ |
| Ex. 5-10 | 3.0 | " | " | " | " | " | " | " | " | " | 374 | 463 | 644 | 734 | |
| Ex. 5-11 | 2.0 | " | " | " | " | " | " | " | " | " | 221 | 363 | 561 | 613 | Δ |
| Ex. 5-11 | 3.0 | " | " | " | " | " | " | " | " | " | 266 | 371 | 542 | 686 | |
| Ex. 5-12 | 2.0 | " | " | " | " | " | " | " | " | " | 135 | 224 | 376 | 455 | X |
| Ex. 5-12 | 3.0 | " | " | " | " | " | " | " | " | " | 144 | 217 | 349 | 427 | |
| Ex. 5-25 | 3.0 | | | | | | | | | | 342 | 486 | 652 | 721 | |
| C. Ex. 5-1 | 2.0 | 32.2 | 41.3 | 15.0 | 1.0 | 7.8 | — | — | — | 1.37 | 278 | 460 | 614 | 668 | ⊙ |
| C. Ex. 5-2 | " | " | " | " | " | " | " | " | " | " | 265 | 454 | 619 | 728 | ○ |
| C. Ex. 5-3 | " | " | " | " | " | " | " | " | " | " | 213 | 369 | 586 | 705 | □ |
| C. Ex. 5-4 | " | (Ordinary portland cement) | | | | | | | | | 282 | 454 | 626 | 716 | ⊙ |

(Note) C. Ex.: Comparative Example
1) Pulverized degree of slag (Blaine value): 4500 cm²/g
[a] Compressive strength of mortar after being cured in water
[b] Amounts of remaining Ca(OH)₂
⊙ Considerably great amount
○ Great amount
□ Small amount
Δ Very small amount
X None

TABLE 15

| Ex. No. | SiO$_2$ | CaO | Al$_2$O$_3$ | Fe$_2$O$_3$ | MgO | Na$_2$O | P$_2$O$_5$ | F | Ratio by mol C/S | Mixing ratio with portland cement | Steam curing time & compressive strength (kgf/cm) (Steam curing) 12 hours |
|---|---|---|---|---|---|---|---|---|---|---|---|
| | | | | | | | | | | P:Slag | |
| Ex. 5-13 | 50 | 0 | 30 | 5 | 5 | 5 | 5 | 0 | 0 | 80:20 | 333.3 |
| Ex. 5-14 | " | " | " | " | " | " | " | 0 | " | 60:20 | 277.7 |
| Ex. 5-15 | 60 | 0 | 20 | 5 | 5 | 5 | 2.5 | 2.5 | " | 80:20 | 301.8 |
| Ex. 5-16 | " | " | " | " | " | " | " | " | " | 60:40 | 310.1 |
| Ex. 5-17 | 65 | 0 | 15 | 5 | 5 | 5 | 0 | 5 | " | 80:20 | 312.4 |
| Ex. 5-18 | " | " | " | " | " | " | 0 | " | " | 60:20 | 324.5 |
| Ex. 5-19 | 85 | 0 | 0 | 10 | 0 | 5 | 0 | 0 | " | 80:20 | 328.6 (slag Blaine: 4500) |
| Ex. 5-20 | 85 | 0 | 0 | 10 | 0 | 5 | 0 | 0 | " | 60:40 | 292.4 (slag Blaine: 4500) |
| Ex. 5-21 | 90 | 0 | 0 | 0 | 0 | 5 | 0 | 5 | " | 80:20 | 409.8 (slag Blaine: 4500) |
| Ex. 5-22 | 90 | 0 | 0 | 0 | 0 | 5 | 0 | 5 | " | 60:40 | 362.6 (slag Blaine: 4500) |
| Ex. 5-23 | 50 | 0 | 0 | 10 | 15 | 15 | 10 | 0 | 0 | 80:20 | 297.1 (slag Blaine: 4500) |
| Ex. 5-24 | " | " | " | " | " | " | " | " | " | 60:40 | 188.1 (slag Blaine: 4500) |
| C. Ex. 5-5 | (Ordinary portland cement) | | | | | | | | | | 342 |
| C. Ex. 5-6 | Mixture of portland cement and crushed product of ISO standard sand | | | | | | | | | P:Sand 80:20 | 281 |
| C. Ex. 5-7 | Mixture of portland cement and crushed product of ISO standard sand (Blaine value: 4500 cm$^2$/g) | | | | | | | | | 60:40 | 158 |

(Note)
P: portland cement
1) Amounts of remaining Ca(OH)$_2$
⊚ Considerably great amount
○ Great amount
□ Small amount
Δ Very small amount
X None
2) Pulverized degree of mixed slag (Blaine value):
3000 cm$^2$/g, partly 4500 cm$^2$/g included Industrial Utility The hardening composition of the present invention provides hardened products having excellent strength when it is simply mixed with water and cured. Therefore, it can be advantageously incorporated into various types of concrete materials and also can be used as a variety of settable fillers. Moreover, through use of the composition, refuse-incinerated ashes and sewage sludge can be effectively utilized and recycled as a resource.

We claim:

1. A hardening composition comprising (A') a slag composition selected from the group consisting of sewerage sludge-incinerated fused slag, fused slag produced from municipal refuse-incinerated substances, crushed stone sludge-incinerated fused slag, concrete waste-incinerated fused slag, and fly ash-incinerated fused slag; and (B') an alkaline activator, and wherein said slag composition contains CaO and SiO$_2$ in a weight ratio of CaO to SiO$_2$ of ≦1, and wherein said slag contains alkali component(s) in an amount of 1–10 weight percent.

2. The hardening composition according to claim 1, wherein the slag composition (A') is in the form of powders, granules, or grains.

3. The hardening composition according to claim 1, wherein the alkaline activator is selected from the group consisting of alkali metal hydroxides, alkaline earth metal hydroxide, alkali metal salts of weak acids, and alkaline earth metal salts of weak acids.

4. The hardening composition according to claim 1, wherein the alkaline activator (B') is a portland cement composition.

5. A hardened product obtained through curing of a mixture of the hardening composition as defined in claim 1 and water.

6. A hardened product obtained through curing of a mixture of the hardening composition as defined in claim 1, water, and an aggregate selected from sand, gravel, crushed stone, lightweight aggregate, or the slag composition (A') in coarsely crushed form.

7. The hardened product according to claim 6, wherein the aggregate is the slag composition (A') in coarsely crushed form.

8. The hardening composition according to claim 1, wherein the slag composition contains halogen in an amount of 0.1 to 10 weight percent.

9. The hardening composition according to claim 8, wherein the slag composition contains halogen in an amount of 0.1 to 8 weight percent.

* * * * *